(12) United States Patent
Byrne et al.

(10) Patent No.: US 11,648,614 B2
(45) Date of Patent: May 16, 2023

(54) ROTARY SERRATOR KNIFE

(71) Applicant: IKG USA, LLC, Houston, TX (US)

(72) Inventors: Patrick Byrne, Friendswood, TX (US); Chad McClendon, Peatland, TX (US)

(73) Assignee: IKG USA, LLC, Houston, TX (US)

( * ) Notice: Subject to any disclaimer, the term of this patent is extended or adjusted under 35 U.S.C. 154(b) by 0 days.

(21) Appl. No.: 17/451,208

(22) Filed: Oct. 18, 2021

(65) Prior Publication Data
US 2022/0032382 A1 Feb. 3, 2022

Related U.S. Application Data

(62) Division of application No. 15/977,007, filed on May 11, 2018, now Pat. No. 11,173,556.

(60) Provisional application No. 62/504,938, filed on May 11, 2017.

(51) Int. Cl.
*B23D 19/06* (2006.01)
*B23D 19/08* (2006.01)
*B23D 35/00* (2006.01)

(52) U.S. Cl.
CPC ............ *B23D 19/06* (2013.01); *B23D 19/08* (2013.01); *B23D 35/001* (2013.01); *B23D 35/004* (2013.01)

(58) Field of Classification Search
CPC .... B23D 19/06; B23D 35/004; B23D 35/001; B23D 19/08; B23D 61/04; B23D 61/028; B23D 61/025; B23D 61/023; B26D 61/021; B24D 5/12; B27B 33/02; Y10T 83/9319; Y10T 83/9323
USPC ... 83/13, 835, 838, 651, 853, 854, 855, 830, 83/831, 832, 833, 834, 848; 76/112; 144/235
See application file for complete search history.

(56) References Cited

U.S. PATENT DOCUMENTS

| | | | |
|---|---|---|---|
| 845,764 A * | 3/1907 | Curtis | B26D 1/626 |
| | | | 29/6.1 |
| 1,829,532 A * | 10/1931 | Olson | B23D 25/12 |
| | | | 83/345 |
| 3,329,049 A * | 7/1967 | Hubbard | B26D 1/38 |
| | | | 83/332 |
| 3,640,165 A * | 2/1972 | Yamaguchi | H02K 15/026 |
| | | | 83/345 |

* cited by examiner

*Primary Examiner* — Ghassem Alie
(74) *Attorney, Agent, or Firm* — Withers Bergman LLP

(57) ABSTRACT

A coil slitting tool in the form of a rotary serrator knife for use on coil slitting machines includes a plurality of serration undulations disposed on one or more faces about the outer periphery. The rotary serrator knife tool may incorporate a concentrically located bore about an inner diameter for mounting on an arbor and may further incorporate a keyway. The rotary serrator knife may be formed from an assembly having, a central rotary disk about which mount one or more removable inserts including the serration undulation portion. The one or more removable inserts may include serration undulations on one side or two sides and mount substantially to the perimeter of a mounting disk by use of fasteners.

18 Claims, 15 Drawing Sheets

ROTARY SERRATOR KNIFE

CROSS REFERENCE TO RELATED APPLICATIONS

This application is a divisional application of U.S. patent application Ser. No. 15/977,007, filed May 11, 2018, which claims the benefit of U.S. Provisional Application No. 62/504,938, filed May 11, 2017, the contents of each which are incorporated herein by reference in their entirety for teachings of additional or alternative details, feature and/or technical background, and priority is asserted from such.

BACKGROUND OF THE INVENTION

Field of the Invention

The present invention generally relates to coil slitting tools such as, and without limitation, rotary serrator knives used in the processing of coiled metal sheet stock.

Description of the Related Art

Metal grating, manufactured from bar stock, is commercially available for walkways, stairs, platforms, and covers where high strength to weight and limited resistance to air flow may be desired. Smooth bar grating is prepared from mild steel flat bar stock aligned in a parallel fashion with a given separation between the up-righted bars, often maintained by a secondary stock of rod attached at right angles. The bar stock is often prepared from large coils of sheet stock by slitting either in non-continuous sections (for example, cut across the width of the coil stock) or as a continuous process as the coil is unwound. Slitting is defined as the method for dividing stock into two or more pieces by a shearing action of two opposing tooling surfaces thereby fracturing the material into parts along the slitting line. Slitting may divide sheet material into two or more unique sub-parts and can be performed one at a time, or in multiples.

Heretofore, serrated metal bar stock, as might be used in metal grating, was produced from linear shears having fixed length, thereby producing bar of a predetermined and fixed maximum length. Serrated edge bar grating, in contrast to, smooth edge bar grating provides greater resistance to slipping. Linear shear tooling currently used to fabricate serrated bar stock mandates stock be cut from the width of the coil, or a length of stock be cut from the coil not exceeding the linear shear capacity; a time consuming, wasteful, and inefficient process when bar of various sizes are required. This added step in linear shearing requires more time, more equipment to handle the large cut sheet, and more shop floor space to manage the added processing. Serrations in bar stock used for serrated grating, may be produced from coiled, or uncoiled stock and fabricated by slitting via one or more specifically designed types of tooling as described herein.

SUMMARY OF THE INVENTION

An exemplary embodiment is directed to a rotary serrator knife having an outer perimeter defined by an outer diameter, an inner perimeter defined by an inner diameter concentrically located to the outer diameter, a first face and a second face separated from each other by a predetermined distance, an outer perimeter surface defined by the outer perimeter and the predetermined distance of the first face from the second face, with an inner perimeter surface defined by the inner perimeter and the predetermined distance of the first face from the second face, the inner perimeter surface connected to the outer perimeter surface by the first face and the second face, the second face comprising a substantially flat surface, and the first face comprising undulations circumferentially disposed between the inner perimeter and the outer perimeter.

The exemplary embodiment above may further include a substantially flat surface on the first face, the substantially flat surface adjoining the undulations and extending inward to the inner perimeter. An inner portion may be included in the exemplary embodiment comprising a substantially flat surface, and an outer portion comprising the undulations, where the inner portion extends between the inner perimeter and the undulations. In addition to those above, the undulations may comprise a flat-top peak and valley pattern or the undulations may comprise a sinusoidal pattern. The undulations can have peaks co-planer with the substantially flat surface of the first face, or the height of the undulations can descend with decreasing radial distance toward the inner perimeter, or the second face may comprise circumferentially disposed undulations disposed between the substantially flat surface of the second face to the inner perimeter. A keyway can be disposed about the inner perimeter, with the keyway synchronized to, or with, the serration undulations. In various embodiments the perimeter is hardened and/or the rotary serrator knife material composition can be selected from high carbon steel alloy, tool steel, high speed steel, and tungsten carbide.

The rotary serrator knife of the exemplary embodiment can include a disk part having an outer disk perimeter surface, one or more replaceable insert parts comprising the circumferentially spaced undulations, and the one or more replaceable insert parts mounted to the disk part at the outer disk perimeter surface. The one or more replaceable inserts part can be retained by fasteners. The rotary serrator knife of the exemplary embodiment may include: a groove about the outer disk perimeter surface; a first insert face on the one or more replaceable inserts parts; a second insert face on the one or more replaceable insert parts; an insert mounting face on the one or more replaceable insert parts, the insert mounting face comprising a tongue; the one or more replaceable inserts parts mounted to the disk part wherein the tongue mates with the groove; or the one or more replaceable insert parts is retained by one or more fasteners, where the fasteners can pass through the disk part and the tongue of the one or more replaceable insert parts.

Another exemplary embodiment is directed to a rotary serrator knife having a rotary disk having an outer perimeter surface defined by an outer diameter, and one or more replaceable inserts having serration undulations, the one or more replaceable inserts mounted to the rotary disk at the outer perimeter surface. The rotary disk can have one or more grooves about the outer perimeter surface, and the one or more replaceable inserts can each have a tongue, where the tongue of the one or more replaceable inserts is therein removeably mated to the groove. One or more of the replaceable inserts can be retained to the rotary disk by one or more fasteners, and one or more through holes in the tongue of the one or more replaceable inserts and one or more retaining holes disposed circumferentially about the rotary disk proximal to the outer diameter, where the one or more through holes in the tongues accept the one or more fasteners through the one or more retaining holes.

The exemplary embodiment above may further include one or more keyways, wherein the serration undulations of the one or more replaceable inserts are synchronized to the one or more keyways. Additionally, the one or more replaceable inserts have a first face and a second face, the first face comprising the serration undulations, or the first face and the second face comprise the serrations undulations. A plurality of rotary knives having serration undulations and keyways synchronized to the serration undulations can be included in the exemplary embodiment with a first rotary serrator knife set comprising a first portion of the plurality of rotary serrator knives; and a second rotary serrator knife set comprising a second portion of the plurality of rotary serrator knives equal to the first; wherein the serration undulations of the first rotary serrator knife set are oriented to opposingly mesh with the serration undulations of the second rotary serrator knife set defining an engagement clearance.

An alternative exemplary embodiment is directed to a method of dividing material into one or more serrated strips, the method comprising presenting the material to a coil slitting machine having a plurality of rotary serrator knives having serration undulations and keyways synchronized to the serration undulations, a first rotary serrator knife set having a first portion of the plurality of rotary serrator knives; and a second rotary serrator knife set comprising a second portion of the plurality of rotary serrator knives equal to the first, the serration undulations of the first rotary serrator knife set opposingly oriented to mesh with the serration undulations of the second rotary serrator knife set and define an engagement clearance determined by the material, the method further comprises penetrating the material in serration patterns by the serration undulations of the first rotary serrator knife set and the second rotary knife set as a result of the engagement clearance, causing separation of the material along the serration patterns forming the one or more serrated strips.

Other features and advantages of the present invention will be apparent from the following more detailed descriptions of the various embodiments, taken in conjunction with the accompanying drawings which illustrate, by way of example, the principles of the invention.

BRIEF DESCRIPTIONS OF DRAWINGS

Figure 5A:
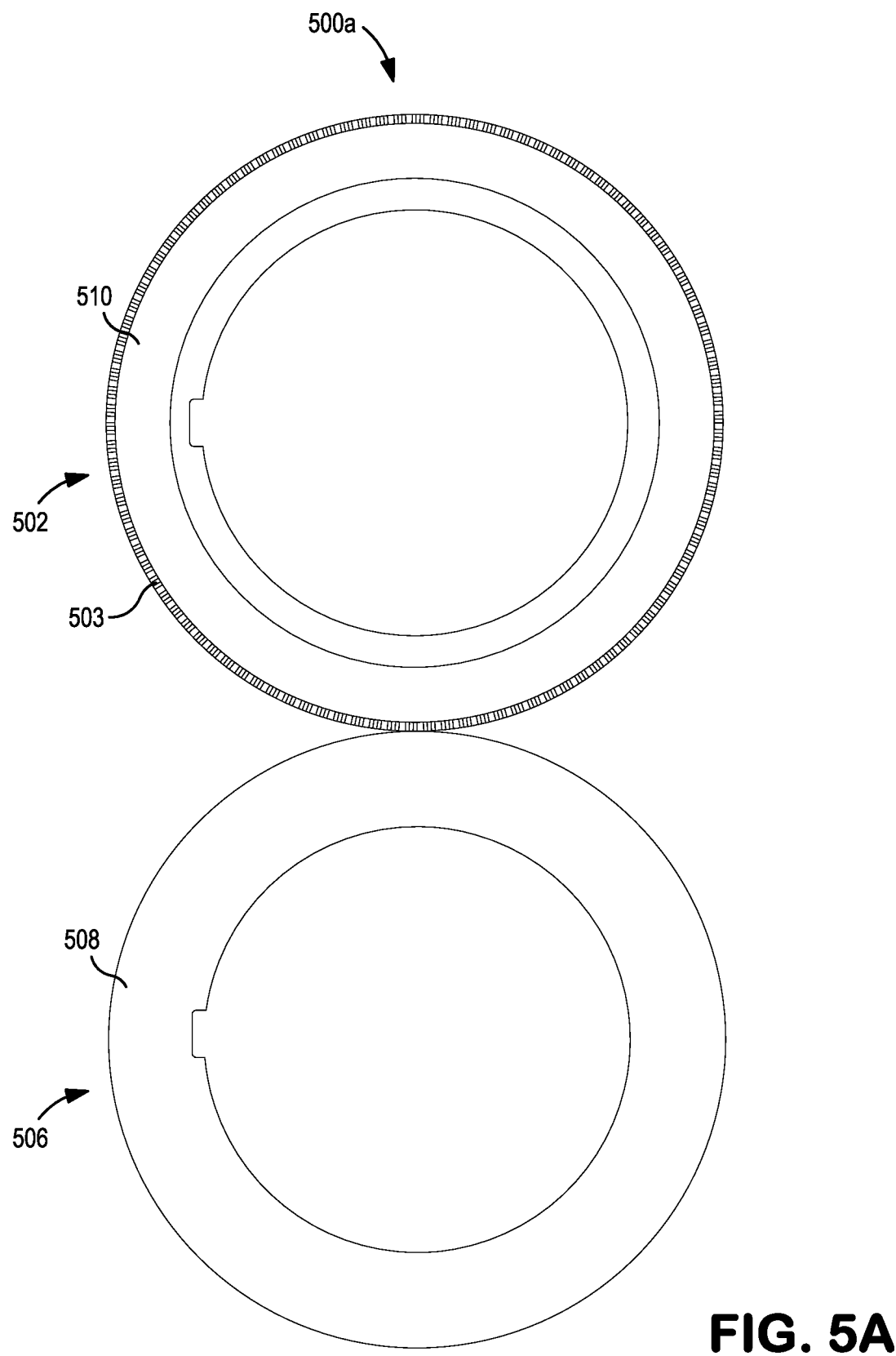
Figure 5B:
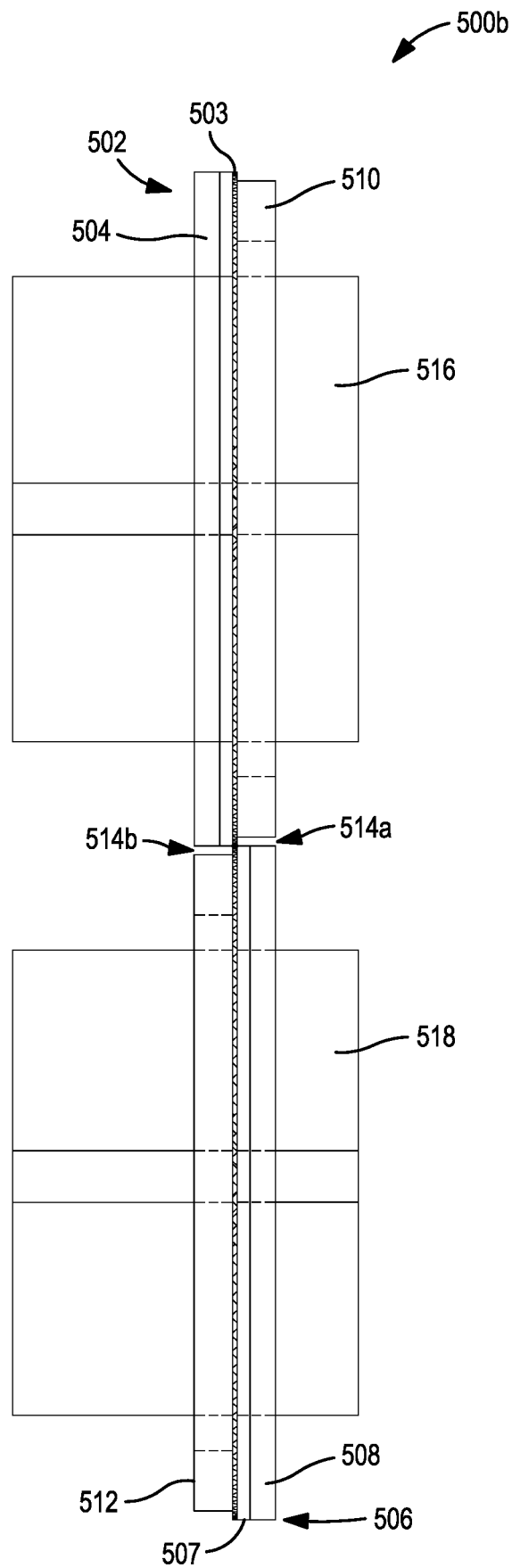
Figure 5C:
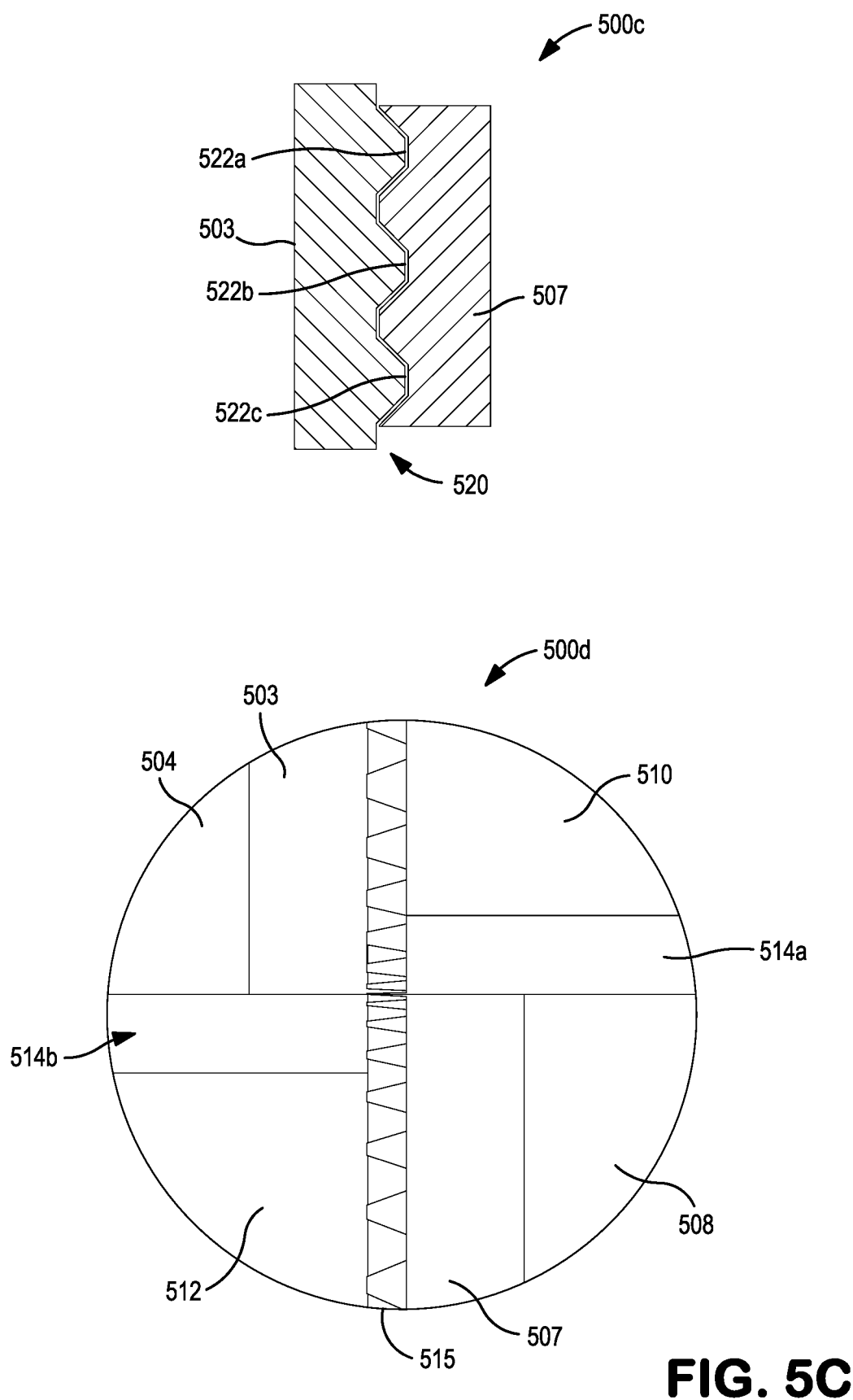
Figure 5D:
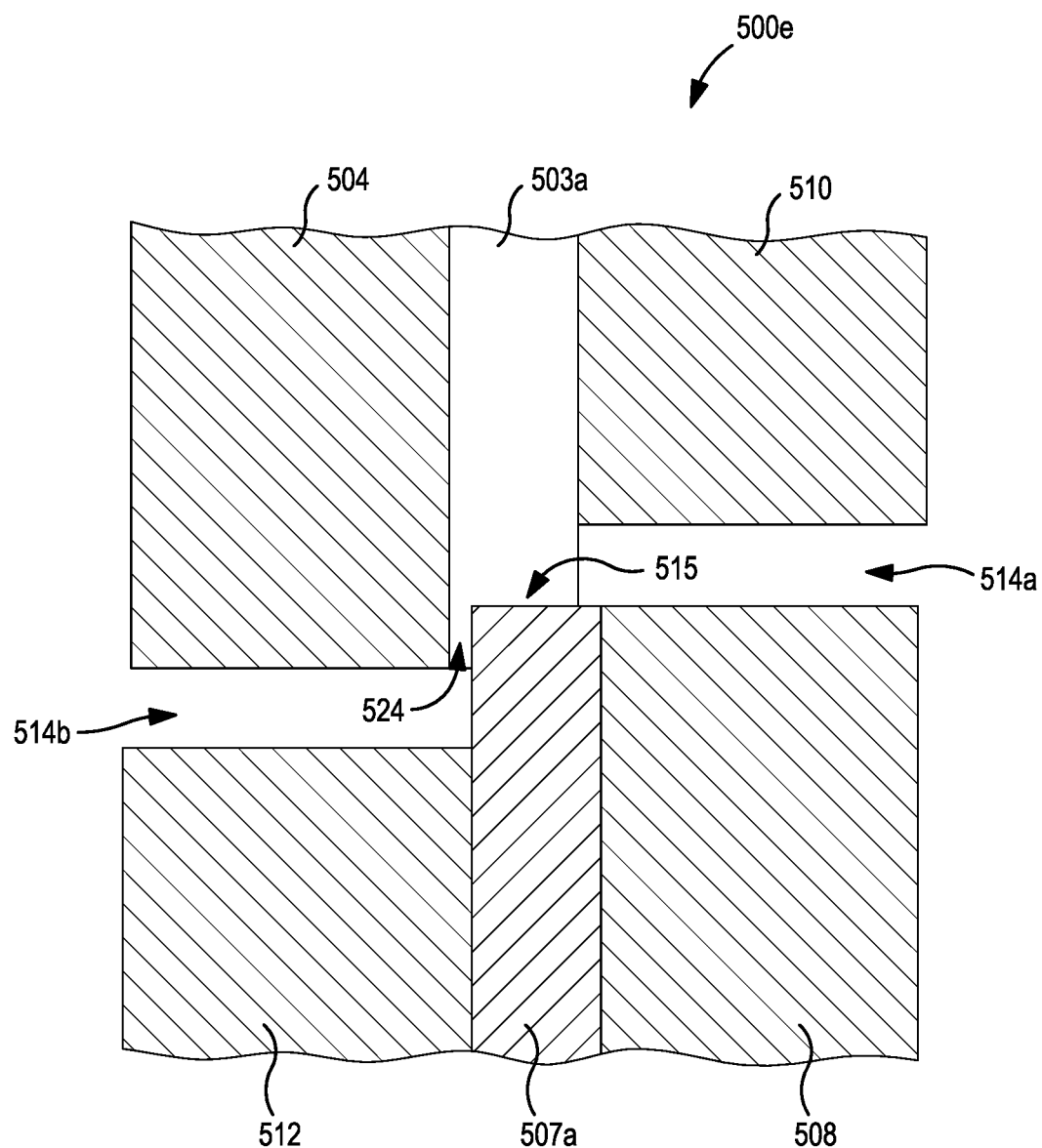
Figure 6:
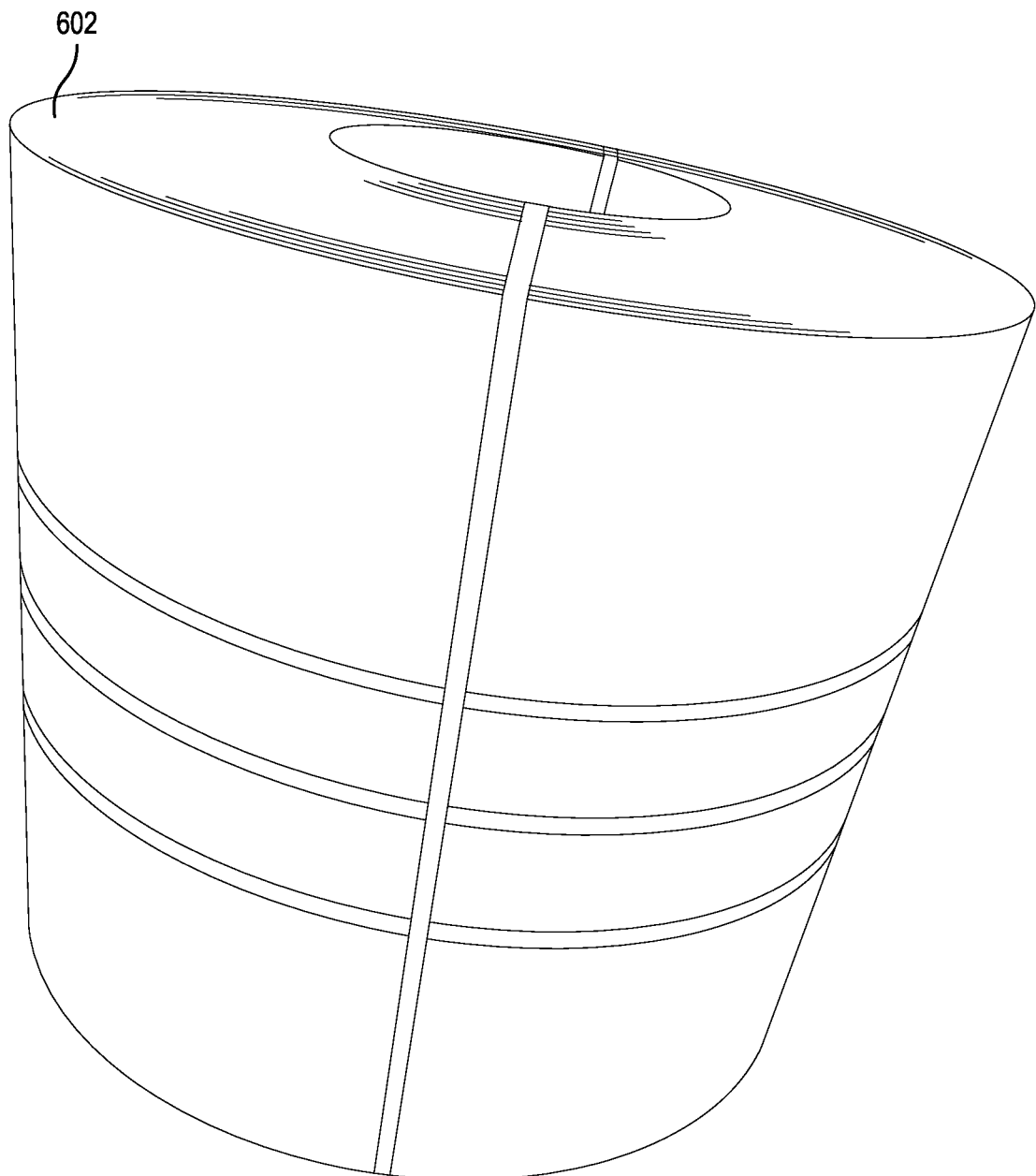
Figure 7:
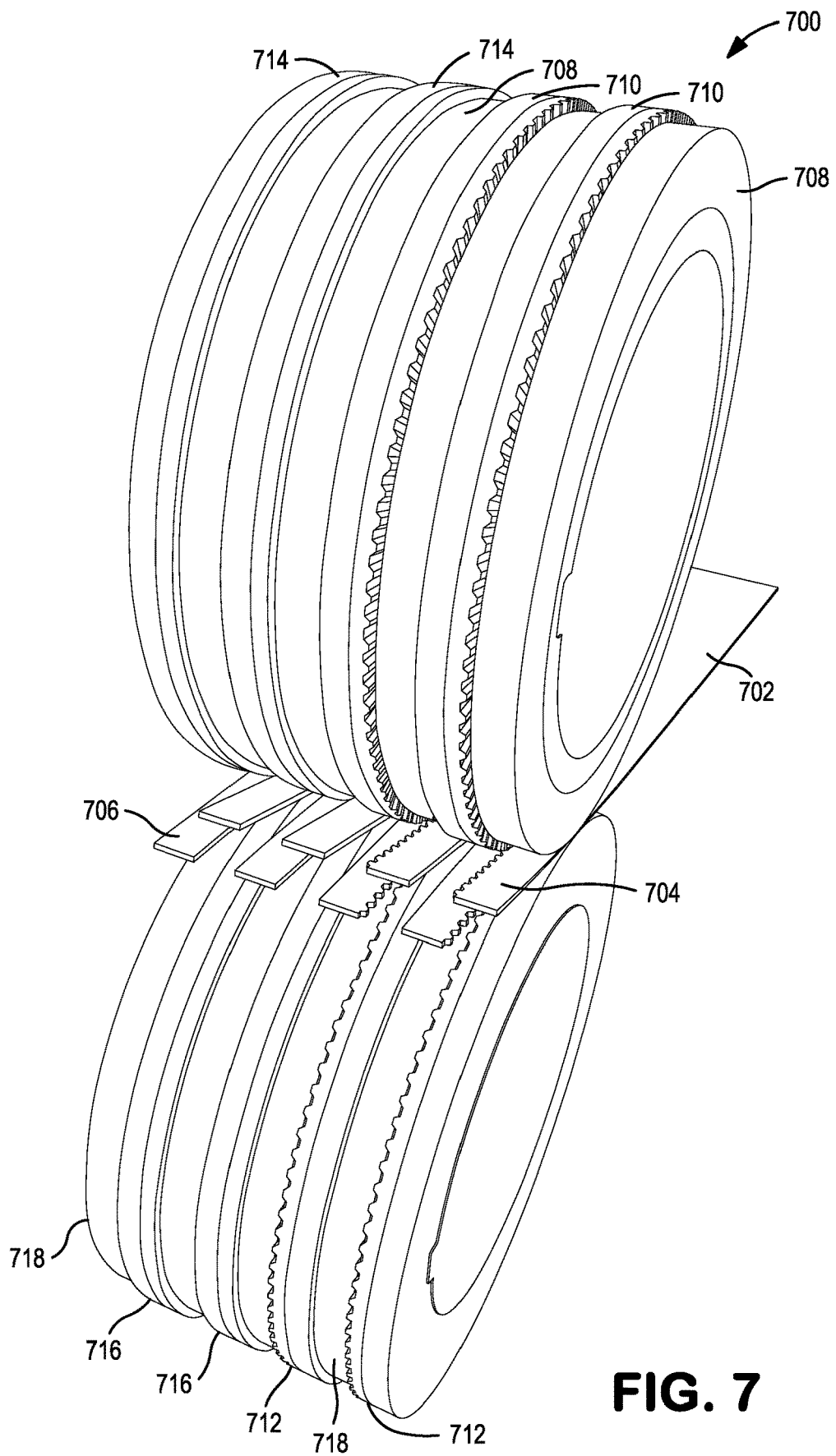
Figure 8:
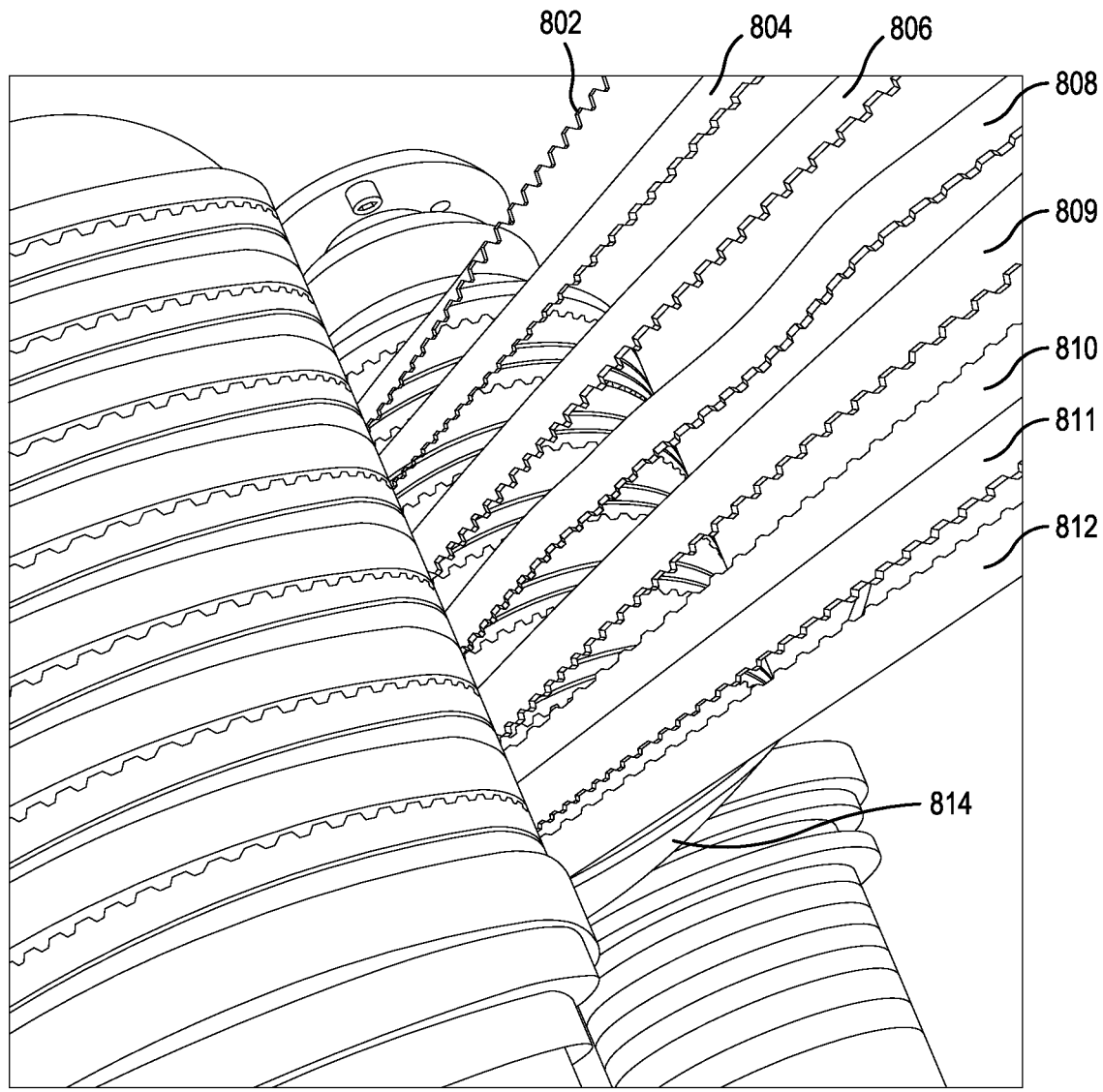
Figure 9:
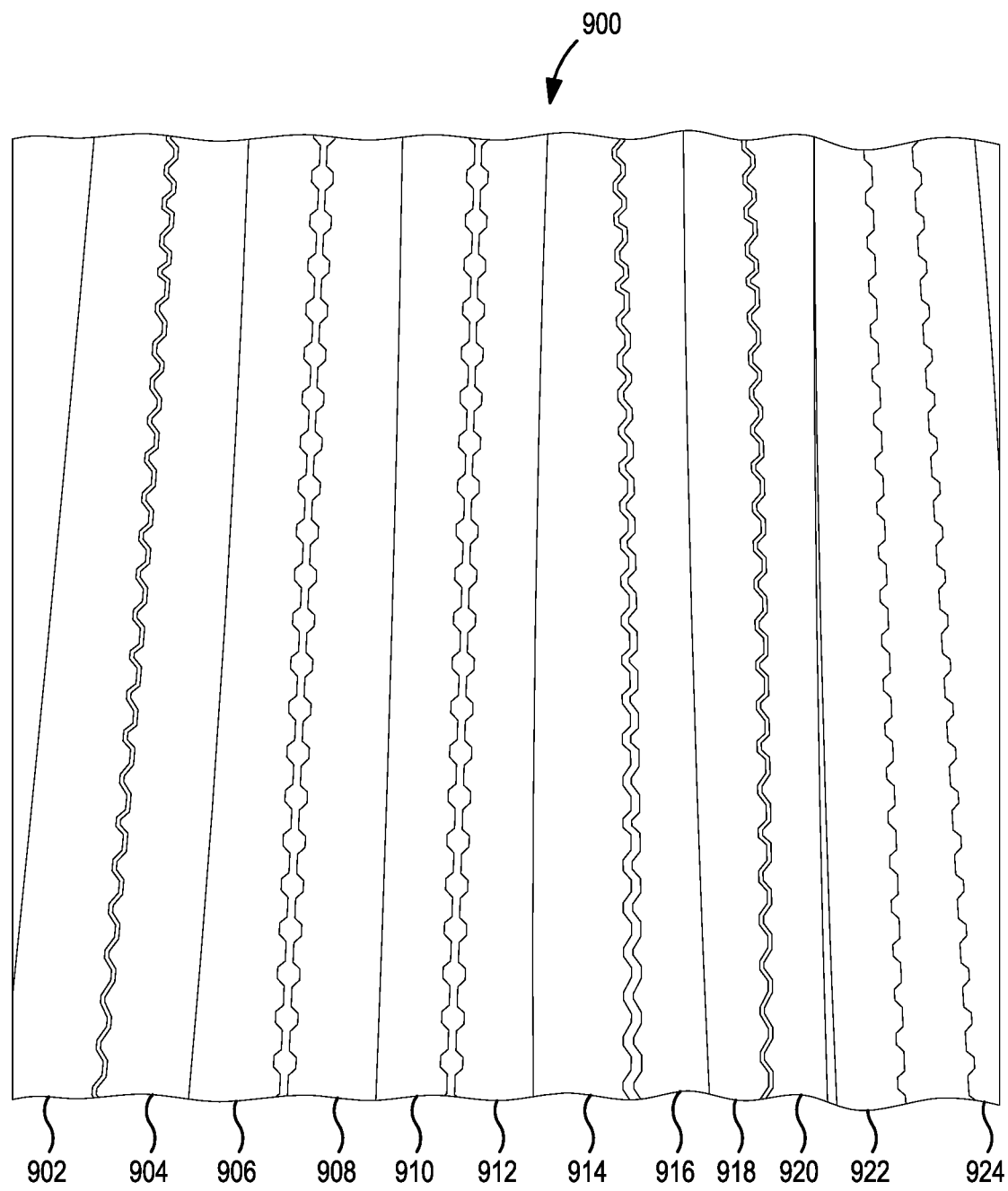

FIG. 5A is a side view illustrating two exemplary embodiments of rotary serrator knives as might be arranged on correspondingly opposing parallel and vertically aligned arbors, wherein serration undulations and tooling profiles of two knives face one another and mesh, the serration undulations of the upper rotary serrator knife facing out of the page and the serration undulations of the lower rotary serrator knife facing into the page;

FIG. 5B is a front view illustrating two exemplary embodiments of single-sided rotary serrator knives arranged on correspondingly opposing parallel and vertically aligned arbors, wherein serration tooling profiles of the two rotary serrator knives face one another and mesh and are accompanied by backing plates and spacers;

FIG. 5C is a cross sectional view (looking down) of an exemplary embodiment of a meshing clearance interface of two exemplar vertically opposing tooling profiles depicted above a front detail view illustrating two exemplary embodiments of single-sided rotary serrator knives as might be arranged on correspondingly opposing parallel and vertically aligned arbors accompanied by backing plates and spacers, wherein the serration tooling profiles of the two knives face one another and mesh;

FIG. 5D is an exaggerated front detail depiction illustrating an exemplary embodiment of a meshing clearance of two exemplary single-sided rotary serrator knives arranged as on correspondingly opposing parallel and vertically aligned arbors, wherein the serration tooling profiles of the two knives face one another;

FIG. 6 is an isometric view illustrating an exemplary embodiment of coil of sheet stock material that can be serrated into bar stock material by a coil slitting machine or system configured with rotary serrator knives;

FIG. 7 is an isometric view illustrating an exemplary embodiment of a plurality of single-sided rotary serrator knives as might be arranged on correspondingly opposing parallel arbors, having sheet material passed therebetween producing bar stock with a serrated edge and bar stock with straight edges;

FIG. 8 is an isometric view, illustrating an exemplary embodiment of a plurality of single-sided rotary serrator knives arranged on correspondingly opposing parallel arbors of a coil slitting machine, having serrated bar stock exiting the machine; and FIG. 9 is a top view illustrating an exemplary embodiment of serrated bar stock as might be produced by a combination of a plurality of rotary serrator knives arranged on correspondingly opposing parallel arbors.

DETAILED DESCRIPTION OF THE INVENTION

Tooling in the form of a rotary serrator knife is provided, comprising serration undulations substantially about its periphery, as shown in FIGS. 1A-C, 2, 4A-4C, 5A-5D, and 7-8. If mounted on an arbor and mated with a correspondingly opposing rotary serrator knife, mounted upon a correspondingly opposing parallel arbor, such as shown in FIGS. 5A-5C and 7-8, metal bar stock having a serrated edge (FIGS. 7-9) can be efficiently and continuously produced from a coil of sheet stock (FIG. 6) limited in length only by the length of the coil sheet stock.

The invention disclosed herein demonstrates tooling formed as a rotary serrator knife wherein one or more such rotary serrator knives may be applied to efficiently impart a serrated edge into stock while shearing.

As described and shown in the embodiments herein, tooling in the form of rotary serrator knives may comprise serration undulations on one or both sides of the rotary serrator knife about the outer circumference of the rotary serrator knife surface. A rotary serrator knife with one serrator side may be defined as a single-sided rotary serrator knife having a serrator side and a non-serrator (or smooth) side. Alternatively, a rotary serrator knife having serration undulations on both sides may be defined as a double-sided rotary serrator knife; having two serrator sides. Fabrication of a double-sided rotary serrator knife is substantially similar to that of a single-sided rotary serrator knife, with the serration undulation fabrication process substantially repeated on the both sides of the rotary serrator knife and is easily understood by the embodiments and description provided herein. A double-sided rotary serrator knife may, however, comprise serration undulations that differ between the two sides.

For the purposes of describing embodiments of rotary serrator knives, it is understood that the disclosure put forth herein may be applied to both single-sided and double-sided rotary serrator knives. It is also understood that reference to a rotary serrator knife is not limited to a single part disk and that a multi-part assembly may comprise similar features.

Rotary serrator knives, may range in diameter, thickness, materials, and material properties or treatments. Rotary serrator knives may be fabricated comprising a diameter from under 2.000 inches to 20.000 inches in diameter or more. For example, a small rotary serrator knife, such as 0.500 inches in diameter, may be fabricated for an arbor of 0.250 inches or less. Additionally, rotary serrator knives may comprise an overall cross sectional thickness on the order of 0.0625 inches to 10.000 inches in thickness or more. Cross sectional thicknesses may also vary relative to the radial distance from the respective center of the rotary serrator knife. For example, a rotary serrator knife may have a cross sectional thickness that is slightly narrower (on the order of 0.05% to 10% of the overall thickness) in the midpoint of the diameter, such as from a hollowing grinding process. As described further below, the thickness may also vary relative to the radial distance from the center, based on a particular feature.

The variations in thickness and diameter are not necessarily related. For example, a rotary serrator knife may be fabricated of small diameter and may have a thin cross-sectional thickness or a wide cross-sectional thickness. Similarly, a large diameter rotary serrator knife may have a narrow or wide cross-sectional thickness. Rotary serrator knives of large diameter and thick cross section, for instance, may be required for slitting thicker, or resilient stock. Furthermore, a rotary serrator knife may also have a relatively large, or relatively small, concentrically located bore to accept an arbor.

To provide longevity of the tooling edges, especially when serrating resilient stock materials, all or a portion of the rotary serrator knife may be formed from various alloys; most notably high carbon steel alloy, tool steel, high speed steel, or tungsten carbide among other heat resistant materials. In addition to the rotary serrator knife material itself, all or a portion of the rotary serrator knife, such as the outer circumferential edge may be hardened or coated with an extremely hard material, such as a ceramic or other known surface treatments to resist wear and heat concentration.

In an exemplary embodiment, a rotary serrator knife comprises an outer perimeter defined by the outer diameter, and an inner perimeter defined by a inner diameter concentrically located relative to the outer perimeter. The rotary serrator knife may be further defined as having an inner perimeter surface and an outer perimeter surface defined by an inner perimeter and outer perimeter respectively, and further defined substantially by a thickness of the rotary serrator knife and the respective diameters; wherein the inner and outer perimeter surfaces are substantially connected by a front face and a rear face. The intersection edges of the front and rear faces with the inner perimeter surface may be fabricated to include chamfering at the intersecting edge, such that the chamfer sufficiently relieves the edge.

The rear face of the rotary serrator knife may further comprise a flat rear portion that is substantially flat, and the front face may further comprise a flat front portion that is also substantially flat, the flat front portion adjoining a serration undulation portion at a parting diameter and extending from the inner diameter toward the parting diameter; and the serration undulation portion extending from the parting diameter to the outer diameter.

Parting diameter locations may be substantially biased toward the outer diameter, substantially midway between the inner diameter and outer diameter, or substantially biased toward the inner diameter. In a further exemplary embodiment, the parting diameter is located substantially biased toward the outer diameter, wherein the parting diameter resides at roughly 95 percent of the rotary serrator knife diameter. The parting diameter may be further bias to reside between at least 99 percent of the rotary serrator knife diameter or down to at least 5 percent of the rotary serrator knife diameter.

The inner diameter of the rotary serrator knife may define a concentrically located bore able to accept an arbor. The concentrically located bore about the respective center of the rotary serrator knife and having a diameter less than that of the overall diameter, may range in diameter from 0.250 inches or less to over 19.000 inches or more and may vary commensurate with the overall diameter, or may be fabricated to accommodate a specific arbor diameter. Inclusion of such a concentrically located bore gives the rotary serrator knife an appearance of a substantially flat ring having serration undulations about the periphery or one face. The combination of dimension and material/material properties may be determined by a function of the end use, such as coil slitting machine, coil stock materials, or both.

About the inner diameter of a rotary serrator knife, one or more keyways may be disposed coinciding with the concentrically located bore; extending outward from the inner perimeter toward the outer perimeter, and extending through the thickness, from the front face to the rear face. Keyways may be synchronized with the serration undulations to allow additional drive efficiency and synchronization of the rotary serrator knife with the system and other rotary serrator knifes. The one or more keyways disposed about the concentrically located bore may be of a predetermined size, such as a standardized depth and width, or a custom fabricated size according to a specific, non-standardized mounting arrangement. Not limited to one keyway or one size keyway, a rotary serrator knife may comprise one or more keyways of differing size distributed around the concentrically located bore, in an even or uneven manner. In a multiple keyway arrangement, the keyways may be separated by an angle consistent with their sizes, such that the keyways do not interfere with one another. To potentially counter incorrect mounting, a rotary serrator knife may comprise two keyways of differing size distributed about the concentrically located bore in such a fashion that the disk can only mount in one orientation.

As previously described above, a single-sided rotary serrator knife may comprise a front face having a flat front portion adjoining a serration undulation portion. The serration undulation portion in turn may comprise a plurality of serration undulations disposed circumferentially about the front face, extending radially from the parting diameter to the outer perimeter, presenting at the outer perimeter surface a tooling profile comprising an undulating edge juxtaposed to a straight edge and joined by a smooth surface therebetween. Accordingly, the plurality of serration undulations may therein form a pattern about the rotary serrator knife. In a further exemplary embodiment, the serration undulations may be synchronized with and correspond to the location of a keyway, such that they are aligned. In such an arrangement, the rotary serrator knife may synchronize with one or more corresponding rotary serrator knives if they are mounted on correspondingly opposing arbors or a coil slitting machine to properly interface and mesh the serration undulations, thereby providing the correct engagement clearances.

When viewed in cross section, the depth of the serration undulations (notably the valleys) may comprise a portion of the cross sectional thickness T-n (where n can be zero to some number less than T, T being the overall thickness) from about the edge of the front face toward the rear face. This depth may account for a percentage of the overall thickness of the rotary serrator knife. For example, serration depths from about 0.03125 inches to 4.0 inches or more inches are envisioned; and in particular serration depths in the range of 0.09375 of an inch to 0.2500 of an inch. This cross sectional thickness may also vary with diameter relative to the center, or at certain points about the serration undulations. For example, the cross sectional thickness may lessen across the serration undulations, from the outer perimeter toward the parting diameter, thereby creating a relief to the tooling edge. A hollow grind may be produced on a non-serrated face, such as the rear face or flat front portion.

Serration undulations may take the form of any number of configurations and may combine configurations to form various patterns. Configurations, defined by the existence and shape of their elements (peaks, valleys and transitions), may be substantially trapezoidal, saw tooth, box, sinusoidal, substantially sinusoidal, or other curved undulations. As with trapezoidal, sawtooth and curved configurations, the peaks may be substantially flat, curved, or substantially sharp. Valleys, as well, may take the same shapes. Where a trapezoidal pattern, for instance, may have four elements (flat-top peak, leading transition, flat-bottom valley, and trailing transition), other configurations may have fewer elements, or more elements.

Transitions, joining peaks and valleys, may be angled flats, smooth curves, or sharp, as well; limited only by the definition desired and the fabrication capabilities. For example, angled transitions from peak to valley may comprise a shallow angle, or a substantially steep angle to define the serration undulation configuration and ultimately the pattern and tooling profile. In a further exemplary embodiment of a rotary serrator knife, angled transitions may join a definitive flat-top peak with a definitive flat-bottom valley wherein the angled transitions are at about 45 degrees relative to the flat-top peaks. In an alternative embodiment, a rotary serrator knife may comprise a serration undulation pattern comprising a sawtooth configuration, having 'V' shaped peaks and valleys, wherein the transitions between the peaks and valleys is about 35 degrees relative to the plane of the front face flat portion overall, and the peaks and valleys are substantially sharp having minimal curvature and defined by the slitting performance required.

Alternatively, transition angles may be biased in one direction or another, wherein the angles of the transitions relative to the flat front portion are non-congruent. For example, in a biased pattern the angle of the leading transitions may be 90 degrees or near 90 degrees relative to the flat front portion, and the trailing transition may be at an angle less than 90 degrees, such as 45 degrees relative to the front face flat portion.

Angles of transitions, where they are not defined by a sinusoidal form may be of shallow angles, less than 35 degrees, or be steep angles, greater than 35 degrees; such as 45 degrees or more relative to the front face flat portion. Sinusoidal configurations or other curved configurations may also comprise transitions to and from peaks and valleys, in rapid or gradual rising or descending rates, dependent on and defined by the slitting performance desired.

A pitch, defining the distance between successive elements, in a given direction and along a given curve of the serration undulations characterizes the number of undulation repetitions relative to the outer diameter. Pitch may be a function of one or more combinations of desired design, coil stock material, rotary serrator knife size, and rotary serrator knife material. The radially arranged valleys, peaks, and transition elements form radial lines or edges, where the elements intersect. These radial lines have a different pitch relative to each other when measured at the parting diameter and outer diameter; thereby, forming a taper in the element faces, which is further described below with respect to the figures. In an alternative arrangement, the pitch of the serration undulation elements at a constant radial distance may be constant, or vary, such that the peak to peek distance of serration undulations becomes smaller or larger when traversing the rotary serrator knife face circumferentially.

While the pattern of serration undulations disposed about the circumference of a rotary serrator knife can form a constant tooling profile about the outer perimeter surface, a serration undulation pattern may alternatively comprise variations or a combination of configurations, thereby providing a tooling profile with variations about the outer perimeter surface. The result may then be a serration undulation pattern of constant pitch and configuration, a variation in pitch, a mix of configurations, or a combination of pitch and configuration. For example, flat top peaks and valleys followed by saw tooth peaks and valleys may comprise the serration undulations and provide a varied tooling profile about the outer perimeter surface.

In an alternative embodiment to a one piece rotary serrator knife as described above, a two-piece rotary serrator knife assembly may comprise one or more replaceable serration inserts fastened to a rotary disk. The rotary disk or the one or more serration inserts, of the two-piece rotary serrator knife, may be formed from various alloys; most notably high carbon steel alloy, tool steel, high speed steel, or tungsten carbide among other heat resistant materials. In addition to the rotary disk (or serration insert) material itself, the rotary disk (or serration insert) or a portion of the rotary disk (or serration insert), such as the outer edge may be hardened or coated with an extremely hard material, such as a ceramic or other known surface treatments to resist wear and heat concentration.

In an exemplary embodiment, a rotary disk may comprise a primary outer perimeter defined by a primary outer diameter, and an inner disk perimeter defined by a concentrically located inner disk diameter, the inner disk diameter being smaller than the primary outer diameter. The inner disk perimeter may be further defined as comprising an inner disk perimeter surface, defined substantially by the thickness of the rotary disk. The primary outer diameter of a rotary disk may be from under 0.5000 inches to 20.000 inches in diameter or more, and certainly from 3.000 inches to 10.000 inches. Rotary disk thickness, on the other hand, can be on the order of 0.0625 inches to 10.000 inches in thickness or more.

The inner disk diameter of a rotary disk may further define a concentrically located disk bore able to accept an arbor for mounting the rotary serrator knife assembly onto a coil slitting machine. The concentrically located disk bore about the respective center of the rotary disk and having a diameter less than that of the primary outer diameter, may range in diameter from 0.250 inches or less to over 19.000 inches or more and vary commensurate with the primary outer diameter and may be fabricated to accommodate a specific arbor diameter. Inclusion of such a concentrically located disk bore gives the rotary disk an appearance of a substantially flat ring. The combination of dimension and material/material properties may be determined by a function of the end use, either by coil slitting machine, coil stock materials, or both.

The primary outer perimeter of an exemplary embodiment of a rotary disk may be further defined as comprising a front primary mounting surface and a rear primary mounting surface separated by an insert alignment groove residing therebetween, the insert alignment groove circumventing the rotary disk and defining a front flange and a rear flange, as well as a front groove wall and a rear groove wall. The front primary mounting surface resides on the outer perimeter of the front flange and conversely the rear primary mounting surface resides on the outer perimeter of the rear flange. The front primary mounting surface is further connected to the inner disk perimeter surface by a front disk face, while the rear primary mounting surface is connected to the inner disk perimeter surface by a rear disk face. While the intersections of the front and rear disk faces to their corresponding front and rear primary mounting surfaces may be left un-chamfered, the intersections of the front and rear primary mounting surface with their respective front and rear groove walls must be relived with a chamfer.

About the inner disk diameter of the rotary disk, a one or more keyways may be disposed coinciding with the concentrically located bore; extending outward from the inner disk perimeter toward the primary outer perimeter, and extending through the rotary disk thickness, from the front disk face to the rear disk face. The one or more keyways may allow additional drive efficiency and synchronization of the rotary serrator knife assembly with the system and other rotary serrator knifes. They may be of a predetermined size, such as a standardized depth and width, or a custom fabricated keyway size according to a specific, non-standardized mounting arrangement. Not limited to one keyway or one size keyway, a rotary disk of a rotary serrator knife assembly may comprise one or more keyways of differing sizes distributed around the concentrically located bore, in an even or uneven manner. In a multiple keyway arrangement, the keyways may be separated by an angle consistent with their sizes, such that the keyways do not interfere with one another. To potentially counter incorrect mounting, a rotary serrator knife may comprise two or more keyways of differing size distributed about the concentrically located bore in such a fashion that the disk can only mount in one orientation.

The insert alignment groove, residing about the primary outer perimeter, comprises a groove bottom surface defined by a secondary outer diameter that is distal from the inner diameter and proximal to the primary outer diameter, and joined to the front and rear primary mounting surfaces by a front groove face and a rear groove face respectively. The depth of the grove may be from approximately 1 percent to 10 percent or more of the overall diameter, while the width of the groove may be approximately from 10 percent to 50 percent of the thickness of the rotary disk. In addition, the combined widths of the front primary mounting surface, groove bottom surface, and rear mounting surface, substantially equals the thickness of the rotary disk. Alternatively stated, the rotary disk thickness is approximately equal to the sum of the groove width and the two flange thicknesses.

The insert alignment groove may reside substantially in the center of the rotary disk relative to the thickness or be offset to the front face or the rear face. At an extreme offset, the insert alignment groove may transform to, or be replaced by, a rabbet about the perimeter of the rotary disk, such that the rotary disk comprises only one flange and either the front primary mounting surface or the rear primary mounting surface is absent, in conjunction with the coinciding front groove face or rear groove face respectively.

A series of insert retaining holes, configured to accept fasteners, such as, but not limited to screws, bolts, shoulder bolts, taper pins, roll pins, or the like, may be comprised into the rotary disk and distributed circumferentially around the rotary disk at a hole circle greater than the secondary diameter, and less than the primary outer diameter. The insert retaining holes may optionally pass through the front face, front groove face, rear grove face, and rear face, or may stop short of piercing the rear face (or front face if fabricated in reverse). Providing a non-through hole may prevent overly-long fasteners from interfering with any neighboring rotary disc if mounted to an arbor, but at loss of a greater surface area for pins or threads provided by a through hole.

The through holes may also be chamfered at one or more locations to aide in fastener installation or accommodate a fastener head, such as a flat head screw. In one exemplary embodiment, the hole may be partially threaded to accept a screw, or fabricated to accept a replaceable nut, such that the wear of repeated installation and removal of an insert might be counteracted by replacement of the screw and nut. To accommodate use of nuts, a groove circumferentially about the rear face and overlaying the insert retaining holes having a suitable depth and width, may capture a nut and prevent its turning. A partially threaded hole may comprise a thread provided through the rotary disk from the rear grove face to the rear face, the hole from front face to the front groove face left smooth and suitable to support a straight or tapered shoulder. The partially threaded hole may also incorporate a counter bore from the rear groove face toward the rear face, to further support a bolt shoulder. The hole may be further counterbored to accommodate the head of the fastener, such as a shoulder bolt. The hole, as may be fashioned accept a bolt having a tapered shoulder or taper pin, may also be tapered, or partially tapered, such that an insert is drawn to the respective matting surface as the screw is brought to full torque.

In an alternative embodiment, a rotary disk of a two-piece rotary serrator knife may comprise a plurality of mounting holes arranged around a primary outer perimeter, the hole centerlines substantially centered relative to the rotary disk thickness and directed inward on radial lines toward the respective center of the rotary serrator knife. The mounting holes may extend from the primary outer perimeter inward at least 5 percent of the rotary disk thickness to 200 percent of the rotary disk thickness, and at least 100 percent of the fastener diameter to 500 percent of the fastener diameter. The mounting hole may be chamfered, fully or partially threaded and may be partially counterbored, for example to accept a hollow alignment pins. Besides threaded fasteners, other retaining fasteners can be used.

While various arrangement can be envisioned for mounting one or more replaceable serration inserts, such as a ring style insert fabricated to mount to a rotary disk about the outer perimeter; the below description describes a rotary serrator knife assembly comprising a plurality of serration inserts. However, where appropriate the description will apply to all embodiments of one or more serration inserts.

In an exemplary embodiment a serration insert comprises an insert seat defined in part by a seat diameter, an insert tongue, defined in part by an inner tongue surface at a tongue diameter, and tongue thickness, a front insert face and a rear insert face, the two faces connected by an insert outer surface defined in part by an insert outer diameter. The insert seat, insert tongue, front insert face, rear insert face and insert outer surface are further defined by insert mating faces (leading and trailing) extending from the front insert face to the rear insert face, as well as from the insert outer surface to the insert seat and insert tongue; wherein the mating faces are separated by an angle 'a'. The front insert face and the rear insert face are separated by a thickness 't', and the insert seat separated from the insert outer surface by the difference in diameter of the seat diameter and the insert outer diameter. Forming an approximate donut segment, the serration insert is defined by the angle between the insert mating faces, the difference between the tongue diameter, and the insert outer diameter, and the thickness separating the front insert face and the rear insert face.

The insert tongue comprised in a serration insert extends from the insert seat and away from the insert outer diameter. It resides substantially at the midpoint between the front insert face and the rear insert face, thereby defining a front tongue face, a front seat shoulder, a rear tongue face, and a rear seat shoulder, each front seat shoulder and rear seat shoulder extending from their respective insert face (front/rear) to the their respective front tongue face and rear tongue face, the difference being the thickness of the insert tongue.

The insert tongue, which may also comprise one or more circumferentially located through holes (located in a predetermined hole circle at a diameter greater than the tongue diameter, but less than the insert seat diameter), piercing the tongue perpendicular to the front and rear insert faces, allows the serration insert to align with, and properly seat to, a suitably constructed rotary disk; with the tongue precisely residing in the groove between the front and rear flange. The insert tongue extending downward into the groove and away from the insert seat, may be suitable in height to provide maximum material without bottoming the insert tongue in the groove. To facilitate such construction, the insert tongue may be chamfered between the insert mating faces along the intersecting surfaces of the inner tongue surface and the front and rear tongue faces. In doing so, any radius at the bottom of a rotary disk groove will not impede proper seating of the serration insert.

Alternative to the circumferentially located through holes, a serration insert may comprise one or more radially located through holes that extend radially inward from the insert outer surface to the insert seat, or to the insert tongue inner tongue surface. In such a configuration, the insert through hole may be chamfered or counterbored at the insert outer surface to accommodate a fastener head.

The insert tongue may alternatively be offset, such as to accommodate a similarly offset groove of the rotary disk describe above. Through holes in the insert tongue may be threaded, smooth and cylindrical, tapered, or fabricated to restrict mounting variations, such as direction. For example, a tapered hole may restrict fastener insertion if the serration insert is mounted in reverse. Alternatively, an offset of the tongue may indicate reversal of the insert due to misalignment of the insert faces with the face of a suitably constructed rotary disk.

The insert outer surface represents the tooling face that first encounters stock to be serrated. The insert seat is the portion of the insert that mates with the rotary disk and transfers the radial forces from the insert to a rotary disk. The insert mating faces mate with an adjoining insert when two or more serration inserts are mounted to a rotary disk suitably fashioned to accept them and may transfer some of the hoop, or circumferential forces to a mating serration insert thereby dividing these forces among the insert fasteners. However, the insert may be radial preloaded to the seat of the corresponding rotary disk and further preloaded to the mating faces of adjoining serration inserts. Proper preloading of the serration inserts will minimize movements of the serration inserts when under operating loads.

Comprised within the front insert face, the rear insert face, or both the front and rear insert face of a serration insert, may be one or more undulation sets, segmenting a predetermined serration undulation pattern by the number of inserts to be distributed around a given rotary disk for form a repetitive pattern. By use of a predetermined number of serration inserts for a given rotary disk, the serration undulation pattern is thereby divided into undulation sets. Preferably the number of inserts required for a given rotary disk coincides with the number of undulations by a multiple of whole numbers, thereby providing a consistency of undulation sets for each serration insert. It is also envisioned that inserts of varied undulation sets, or configurations may be combined and mounted onto a rotary disk, subject to the matching of insert sizes and tolerances.

An undulation set is defined by a whole or partial starting element of an undulation and ending after one or more different or similar elements. For example, an undulation set may comprise a leading transition, a flat top peak, a trailing transition and a flat-bottom valley; such as for a trapezoidal configuration. Alternatively, an undulation set may comprise a leading transition of moderate angle, such as 45 degrees, a sharp peak with no flat portion, followed by a vertical, or nearly vertical trailing transition, such as for a sawtooth configuration. In the alternative, an undulation set may begin with a portion of an element and end with the remaining portion of that same element, the combination of the two portions equating to a whole portion of that element. For example, an undulation set may comprise a first portion of a flat-top peak leading a trailing transition followed by a flat-bottom valley, a leading transition, and end with a second portion of a flat-top peak; wherein the combination of the first and second portions of the flat-top peak combine to substantially form a complete flat-top peak element when joined to a mating face of an adjoining serration insert.

As stated above, a serration insert may comprise one or more undulation sets. The number of undulation sets, or partial sets, may be a function of the undulation size relative to the insert size and overall size of the rotary serrator knife. Where a serration inset comprises undulations on both sides, the undulation sets may be the same configuration, different configurations, or the same configuration, just reversed. When properly mounted onto a rotary disk, the serration undulations about the circumference of the tool form a pattern in a manner similar to that described for a one-piece rotary serrator knife. The partial pattern of one insert adds to the partial pattern of the prior leading insert, continuing around the rotary serrator knife, forming a tooling profile at the cutting edge, which in the case of the two-piece rotary serrator knife is the combination and totality of the one or more insert outer surfaces.

In concert with the through holes of the insert tongue, the serration undulations may be aligned with, and correspond to, the location of a keyway. In such an arrangement, the rotary serrator knife may be matched to interface and mesh with one or more corresponding rotary serrator knives if mounted on correspondingly opposed arbors.

One or more rotary serrator knives of either one-piece or two-piece assemblies may be assembled, with or without spacers, to form a stack, wherein the stack may be mounted onto a keyed arbor with a complimentary stack mounted on a correspondingly opposed arbor of a coil slitting system. In the case of a two-piece rotary serrator knife assembly, the inserts, if not previously mounted, are installed according to the alignment requirements and assembled with other rotary serrator knives as above, to form a stack.

As previously described above, a rotary serrator knife, or stack, may be timed with other rotary serrator knives, on the same arbor, opposing arbors, or both. When opposing rotary serrator knives are operated on correspondingly opposed arbors within a coil slitting system, the rotary serrator knives may be keyed to the arbors such that the correspondingly opposed arbors, and ultimately the rotary serrator knives, are interfaced to maintain relative alignment of the serration undulations, wherein the peak (land) of a rotary serrator knife aligns and meshes with a valley (groove) of the paired and opposing rotary serrator knife.

Two or more rotary serrator knives may operate on correspondingly opposed arbors within a coil slitting machine or system; wherein the paired opposing serrator knives, separated by the arbors and mounted such that the serrator undulations of each rotary serrator knife face each other and meshing a portion of their respective serrating undulations with one another, cause an interference gap, both vertically and horizontally, to be formed with respect to incoming stock, and thereby arranged to shear a length of stock passed between them and imparting a serrated pattern to the stock edge once slit.

A rotary serrator knife in conjunction with a paired rotary serrator knife on a coil slitting machine or system may impart serrations through the middle of a parent coil of material and produce two unique coils of serrated material. The serration can also be imparted on one edge of a coil of material to produce a single coil of serrated material. Serrated grating bar stock if generally composed of material that has one edge serrated and the other edge non-serrated, or smooth. As previously described above, rotary serrator knives can be fabricated having narrow or wide cross section to produce serrated bar with various overall width, at least, but not limited to, 0.500 inches wide to 10.000 inches or more in width.

Bias in the transition angles, as described above, might be desirable to produce bar stock having a serration exhibiting a bias in the serrated edge. A varied pattern might provide an improved grip over one with a consistent pattern, such as, such that if used in a coil slitting system, the resulting slit bar stock would exhibit a repeating pattern variation. The various serration undulation patterns, if used in conjunction with a coil slitting system, can produce serrated bar with any pattern.

Coil stock, such as that depicted in FIG. 6 is feed to the coil slitting system wherein the two or more rotary serrator knives penetrate the stock to the point where the strength of the stock to resist the opposing knives is surpassed. Penetration of the stock occurs because the stock thickness exceeds the vertical distance between the opposing rotary serrator knives. However the clearance between the opposed rotary serrator knives determines, for the most part, the quality of the slit. Given the meshing characteristics of the rotary serrator knives, the clearance required to impart the serration pattern into the coil stock is critical. Disclosed in the various embodiments described and shown in the figures below the clearance and further aspects of the invention are illustrated.

Figure 1A:
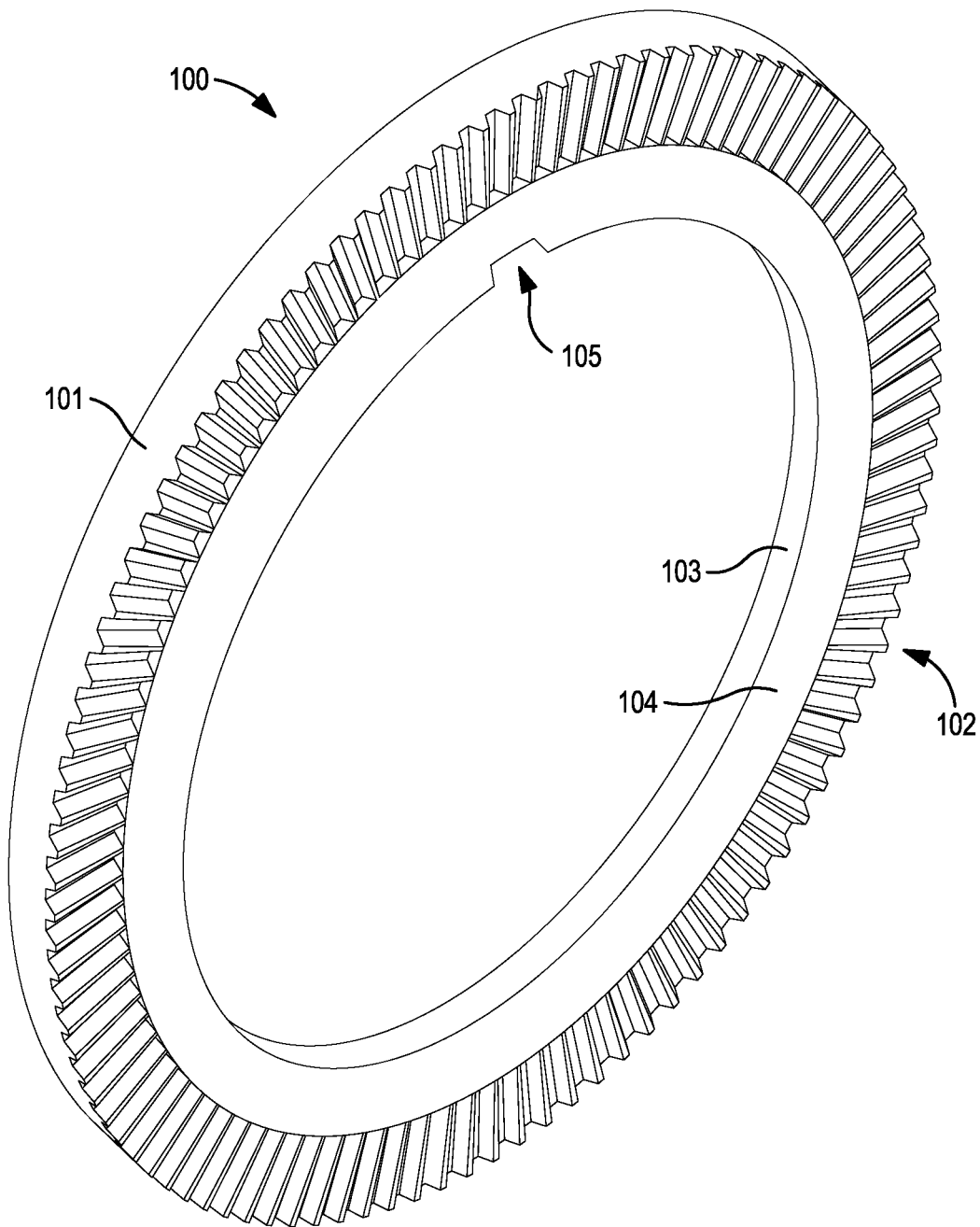
FIG. 1A is an isometric view, illustrating an exemplary embodiment of a single-sided rotary serrator knife.
Figure 1B:
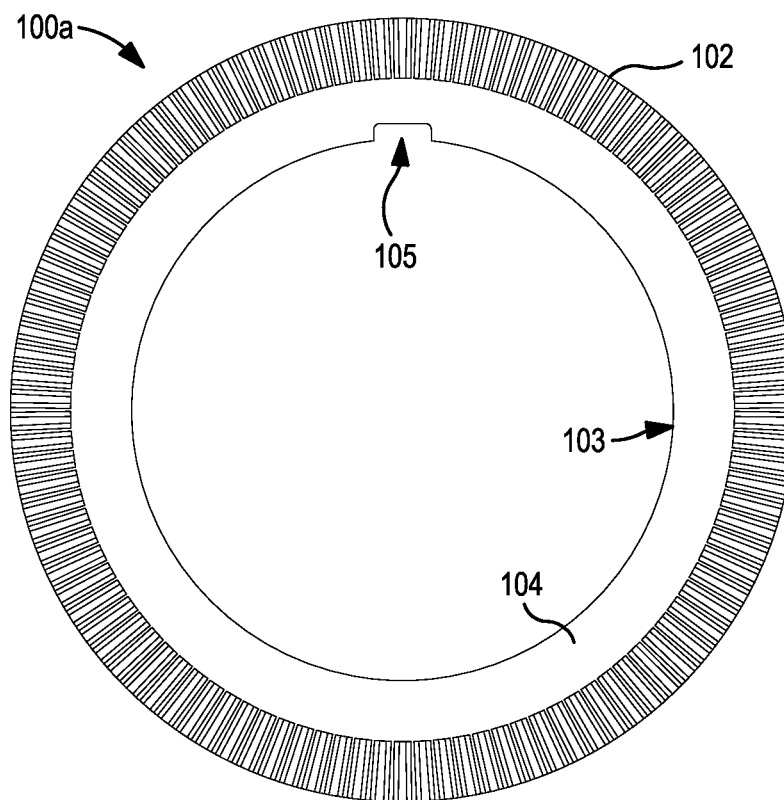
FIG. 1B is a front view, illustrating an exemplary embodiment of a rotary serrator knife.
Figure 1C:
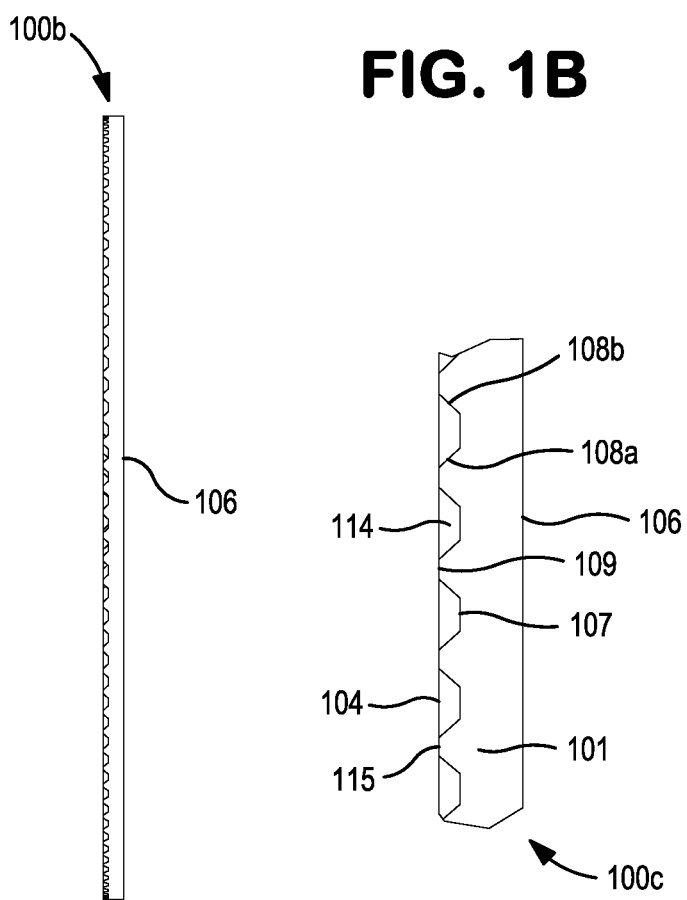
FIG. 1C is a side view, illustrating an exemplary embodiment of a rotary serrator knife and a detail side view illustrating an exemplary embodiment of a rotary knife serrator tooling profile.

Turning to the figures, embodiments of the invention are illustrated in the accompanying drawings in which: the exemplary embodiment of FIGS. 1A-1C, depict an isometric view 100, a front view 100a, a side view 100b, and a detailed side view 100c, of a rotary serrator knife of substantially round shape comprising a substantially round concentrically located bore defined by an inner diameter. The rotary serrator of 100, 100a, and 100b in FIGS. 1A-1C, depicts a substantially large inner diameter relative to the overall outer diameter and may have a substantially large diameter. For example, the outer diameter may be on the order of 19.5 inches, or as small as 0.500 of an inch to 20.000 inches or more. The inner diameter may be on the order of 13.5 inches or as small as 0.2500 of an inch to 19.000 inches or more. Larger and smaller diameters can be created, as well as variations in the ratio of the diameters. A larger inner diameter (bore) for a given outer diameter, as shown by the exemplary rotary serrator knife, provides greater stability.

A substantially narrow thickness when compared to the outer diameter may be achieve, such as depicted in the side view at 100b of FIG. 1C, the rotary serrator knife may have a thickness of about 0.5 inches, and may range of about as small as 0.0625 of an inch to about 4.0 inches or more.

The front face of the exemplary rotary serrator knife comprises a serration undulation portion 102 extending from the tooling edge at the outer perimeter surface 101, toward the center but distal from the rotary serrator knife center and adjoining the flat portion 104 of the rotary serrator knife at the parting diameter, approximately midway between the outer perimeter surface 101 and the inner perimeter 103. The opposing rear face 106, in contrast to the front face of the rotary serrator knife, comprises no serration undulations and is formed to shear the secondary side of bar stock without producing a serrated edge, as shown in FIG. 6 below. Representing a trapezoidal configuration, the serration undulations portion 102 of the exemplary embodiment exhibits flat-top peaks 109 and flat-bottom valleys 107, joined by leading transitions 108a and trailing transitions 108b having congruent angles.

At the parting diameter, where the serration undulation 102 meets the flat portion 104, an inner groove shoulder 114 (FIGS. 1A, 1C) is clearly visible. In addition, the serration undulation peaks may coincide with the adjoining flat portion 104 surface, wherein the thickness of the knife at the serration undulation peaks may be equivalent to the overall knife thickness when measured from the rear face 106 (FIG. 1C). Alternatively, the peaks, or a portion of the peaks, may rest below the flat portion 104, such that the thickness at the serration undulation portion 102, or a part of the serration undulation portion 102, is less than the overall thickness. For instance, if the serration undulation portion 102 is relieved away from the outer perimeter surface 101, the thickness of the rotary serrator knife over the peak and near the parting diameter, would be less. If the thickness on the serration undulation portion 102 near the parting diameter is less, a differential spacing 115 will be present above the peaks in the case of the exemplary embodiment, such differential spacing is too small to show or not present.

The embodiment depicted in FIG. 1A-1B, further exhibit a keyway 105 across the thickness and about the inner perimeter of the exemplary rotary serrator knife to accept a key for locating and timing the rotary serrator knife into a fixed position about an arbor having a corresponding keyway and installed key. The keyway may conform to standard keyway dimension for a given arbor, or system, or be custom sized to fit the requirements. For example, a keyway for the exemplary embodiment shown can be 13.88 inches×1.500 inches, as determined by the width and height from the opposite side of the inner diameter.

Given the precise requirements as described above, a rotary serrator knife may require tight tolerances, such as diameter tolerance of no more than 0.001 of an inch, roundness of 0.003 of an inch, thickness tolerance 0.0005 of an inch or less, parallelism 0.0004 of an inch or less, and perpendicularity of the cutting edge 0.002 of an inch or less.

Figure 2:
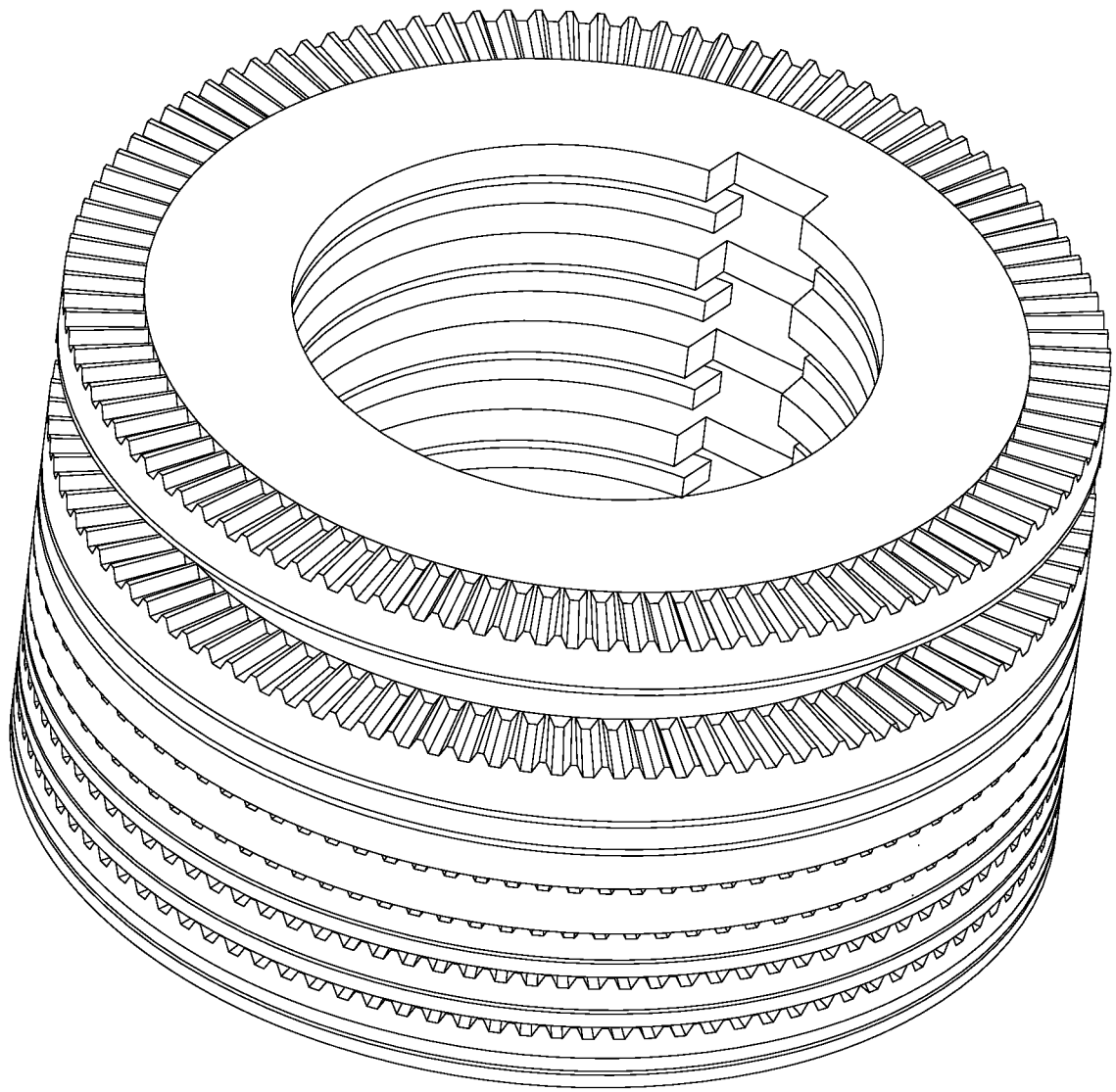
FIG. 2 is an isometric view, illustrating a stacked plurality of exemplary embodiments of single-sided rotary serrator knives.
Figure 3:
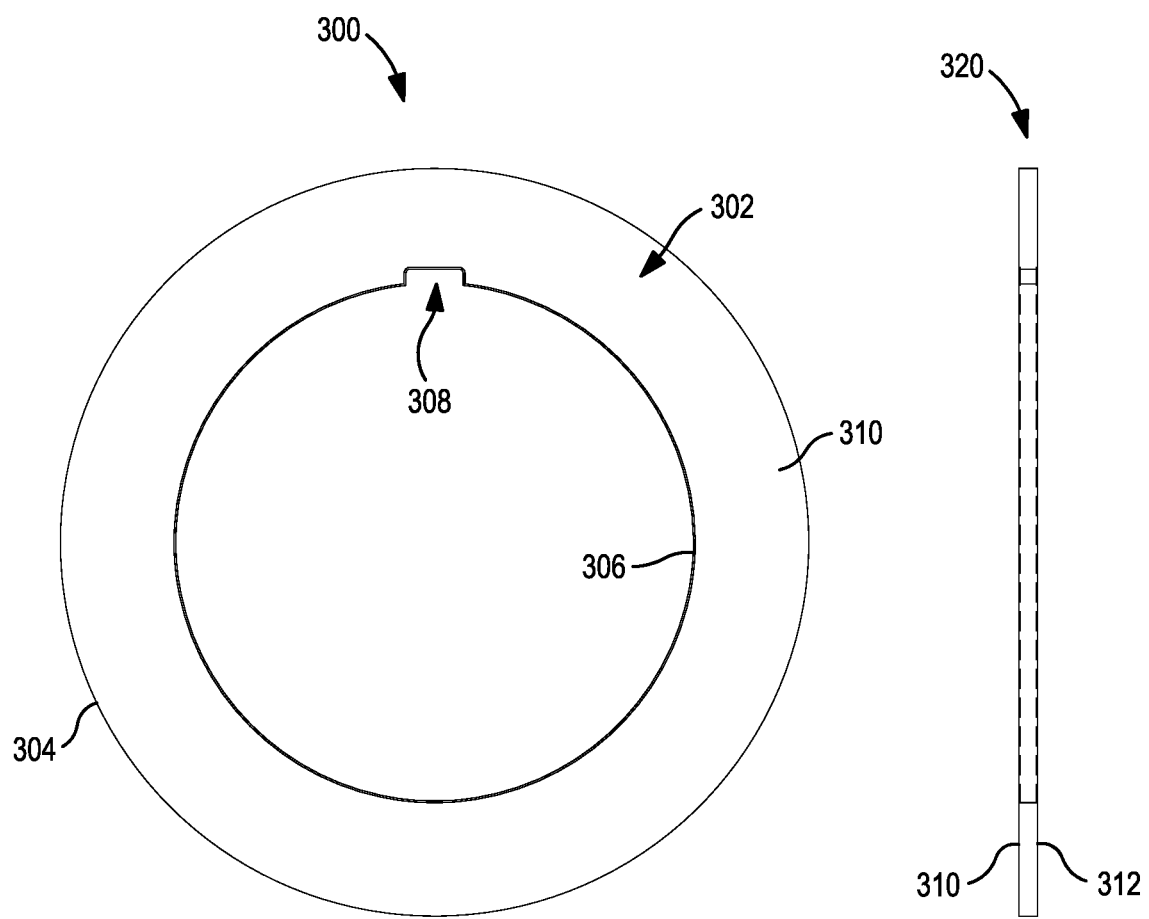
FIG. 3 is a front and side view, illustrating an exemplary embodiment of a plain rotary slitting knife of straight profile.

Potentially representing a stack ready for mounting on an arbor, the embodiments of multiple serrator knives depicted in FIG. 2 illustrates serrations about the outer periphery of the front face of the rotary serrator knives, the inner diameter bore, and the keyway about the inner diameter. Further depicted is the inboard flat portion, adjoining the serration portion. The stack may have shims or spacers to provide correct spacing of the units, dictated by the width of the searing to be performed. As might be performed in a shearing operation, a non-serrated, plain rotary knife 302, as embodied in FIG. 3 and shown in front view 300 and side view 320, might be paired up with rotary serrator knifes to shear the secondary side of bar stock without producing a serrated edge. The exemplary plain rotary knife 302 comprises a keyway 308 to accommodate a keyed arbor as might be used with a rotary serrator knife. The non-serrated, plain rotary knife 302 depicts a flat front portion 310 across the face of the knife, from outer perimeter 304 to inner perimeter 306. The opposing side 312, as depicted in the side view 320, is also flat.

Figure 4A:
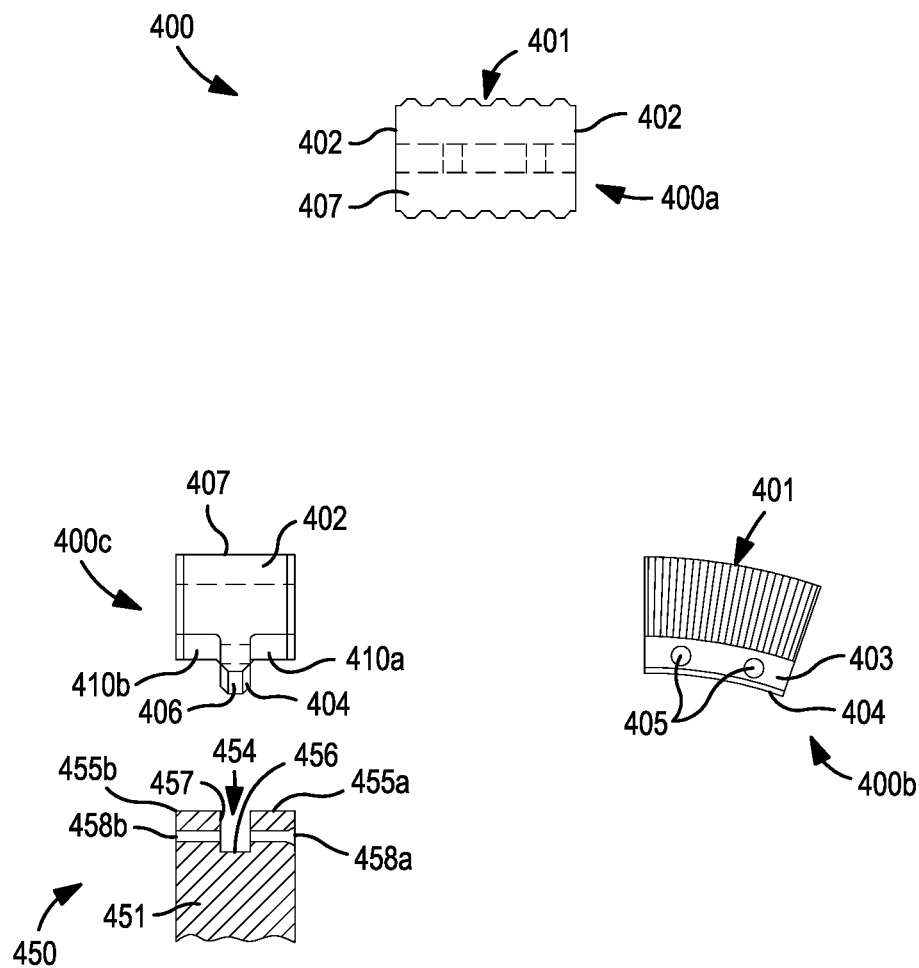
FIG. 4A is a cross-sectional view of an exemplary embodiment of an edge portion of a double-sided rotary serrator knife insert aside depictions of a corresponding exemplary embodiment of a double-sided rotary serrator knife insert illustrated in side view (top right), front view (bottom right), and end view (top left)

An embodiment of a two-piece rotary serrator knife assembly comprising a double-sided serration insert 400, and rotary disk 451 (partial view) are depicted in FIG. 4A. The figure shows various details within a top view 400a, a front view 400b, a side view 400c, and a cross-sectional view 450, of the rotary disk 451 and serration insert 400, highlighting their features. Although not shown, the rotary disk 451 may comprise the same or similar features described above, such as a primary outer perimeter defined by a primary outer diameter, an inner disk perimeter defined by a concentrically located inner disk diameter, wherein the inner disk diameter is smaller than the primary outer diameter. The rotary disk 451 of this embodiment may further comprise other similar features described above, such as and not limited to, an inner disk perimeter surface, a concentrically located disk bore, and one or more keyways about the inner disk diameter.

The drawing depicts a serration insert 400 where the serration insert 400 is removable from the rotary disk 451, but otherwise retained by a fastener (not shown) via the through holes 405, extending through the insert tongue. The through holes align with the one or more holes provided in the flanges 455a, 455b of the rotary disk 451, one of which is represented by the paired and cross-drilled holes 458a, 458b. In practice, the serration insert 400 is seated on the rotary disk 451 with the insert tongue 403 inserted into the groove 454, and aligned such that the through holes 405 aligned with the insert holes 458a, 458b. The insert tongue chamfer 404, while provided to allow clearance at the groove bottom 456 of the rotary disk 451, eases assembly. The current embodiment depicts two holes per serration insert 400, however, one or more fasteners may be employed in an insert, depending on the size or arc length of the insert and the arrangement of the hole-pattern in the mating rotary disk.

Fasteners used to secure the serration insert 400 to the rotary disk 451 may make use of one or more devices, such as threaded fasteners and/or pins. As previously described above, the rotary disk may be threaded to accept screws securing the serration inserts to the rotary disk, or the serration inserts may be threaded to accept screws passed through the rotary disk to secure the serration inserts thereto. For example, hole 458b, in the rear flange 455b may be threaded (not shown), with the opposing hole 458a, in the opposite front flange 455a radiused as shown, or chamfered. The assembly may make use of tapered fasteners in conjunction with tapered holes to properly align the serrator knife insert to the rotary disk. The rotary disk may be fabricated to have a circumferentially raised portion inbound of the serration insert mounting location, and abutting the insert when mounted, to support the insert during use.

The side view depiction 400b further illustrates serration undulations 401 of the serration insert 400. Extending from the insert outer surface 407, the serration undulations 401 end at a diameter equal to the insert seat 410a, 410b (depicted in 400c). The radial pattern of the peak-transition and valley-transition lines for the serration undulations 401 highlight the inward taper and decrease in in pitch relative to a progressing inward diameter away from the insert outer surface, such that the number of undulations, about the diameter of the insert seat, are held constant.

The flattened top view 400a of FIG. 4A, depicts the trapezoidal tooling profile of the serration undulation 102 across the front and rear faces of the serration insert 400 and between the insert-to-insert mating faces 402. The serration undulations depicted are of a flat-top peak (land) and valley (groove) with an approximate forty-five degree leading and trailing transition. Other transition angles are possible, as well as non-congruent transition angles for the leading and trailing transitions. Peak heights, relative to the valley when measured at the periphery of the serration undulations 102, are approximately 6 percent of the total insert width, however the peak height for other embodiments may be greater or shorter. For example, a serration insert having a width of 2.000 inches may comprise a peak height of 0.125 of an inch or from as small as 0.015625 of an inch. Serration inserts themselves may range in width from 0.0626 of an inch to as much as 4.0 inches or more. A change in insert width would normally be matched with a rotary disk equal in in width, however, this is not required. An insert may be wider or narrower than the rotary disk itself. Evident in the depiction 400a of the serration insert 400 are the partial valleys at the insert-to-insert mating faces 402. In this arrangement and when mated to an adjoining insert of similar design, the partial valley of one serration insert will mate with the partial valley of the adjoining insert to form a complete valley. This is verified by the closeness of the valley-transition lines shown in 400b to the mating faces 402.

View of the serration insert 400 aligned over the rotary disk 451 is depicted at 400c and 450. With insert-to-insert mating faces 402 facing into and out of the page, and the rotary disk 451 shown in cross section, one can see how the insert tongue 403 would precisely reside in the groove 454 with the insert seats 410a, 410b coming to rest on the surfaces of the flanges 455a, 455b outer perimeter. The walls of the insert tongue 403 would substantially rest against the rear groove face 457 and front groove face, in either a non-interference fit, an interference fit. As shown in this embodiment, the insert is fabricated to mount around the perimeter of the rotary disk, wherein the periphery of the rotary disk 451 has a corresponding groove 454 into which the insert tongue 403 is inserted and is fastened to the rotary disk via the provided holes fabricated into the insert tongue and corresponding holes on the faces (and about the circumference of the rotary disk proximal to the periphery and transvers to the direction of the groove). The insert tongue 403 bottom surface 406 is fabricated to provide clearance at the groove bottom 456, allowing the surfaces of the flanges 455a, 455b to accept the insert seats 410a, 410b, and transfer the forces exerted during use.

Figure 4B:
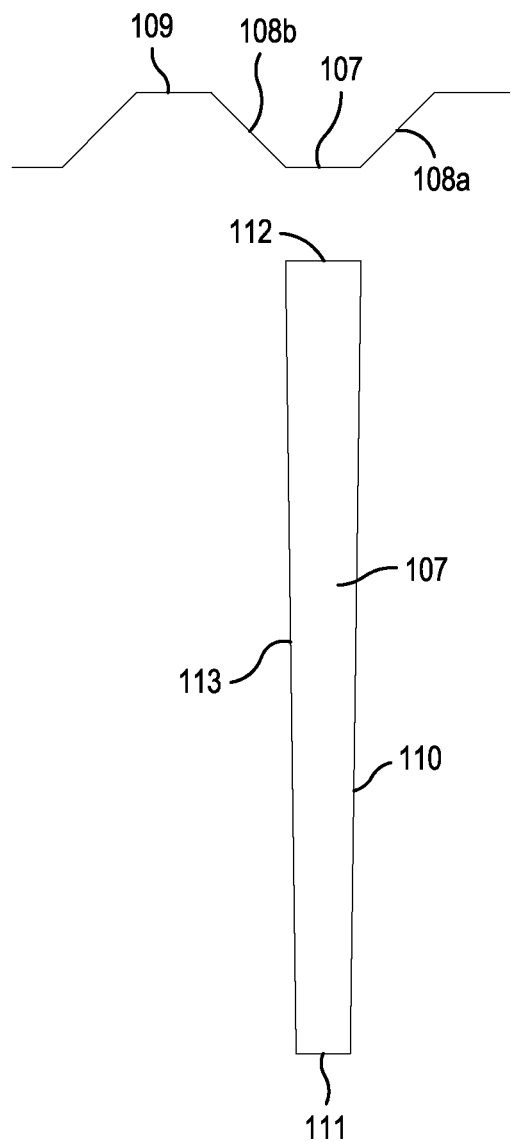
FIG. 4B is an side view and front view, illustrating an exemplary embodiment of a rotary serrator knife tooling profile and exemplary embodiment of an inward taper of flat-top peak and flat-bottom valley undulations.
Figure 4C:
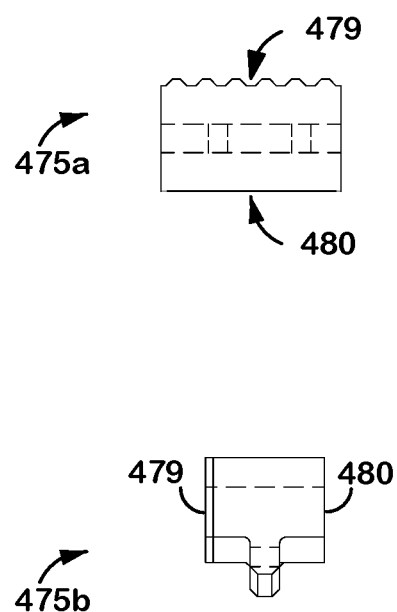
FIG. 4C is an exemplary embodiment of a single-sided rotary serrator knife insert in a cross-sectional view (top) and end view (bottom)

A single-sided insert is depicted in FIG. 4C. The view as depicted at 475a is from the outer tooling surface away from the seat, which has similar characteristics as described above, such as the tongue shown in the depiction of 475b. In this embodiment, serration undulations 479 are provided on one side (one face) of the insert, the opposite side (opposing face) exhibits a substantially flat surface 480 no serration undulations. The tooling surface of two opposing rotary serrator knifes having correspondingly meshed interfaces would therein impart the serration pattern into the edge of material passed therebetween when shearing.

In a further detailed view of the serration tooling profile and taper of the undulations shown in FIG. 4A, a peak 109, followed by a trailing transition 108b, a valley 107 and leading transition 107 are illustrated in FIG. 4B along with a front view of the valley 107. The outline of the valley 107, illustrated below the tooling profile, clearly depicts the taper as the valley-to-trailing-transition line 113 and the valley-to-leading-transition line 110 merge closer when traversing from the valley outer edge 112 to the valley inner edge 111. With respect to the serration insert 400, the valley outer edge 112, resides at the same diameter as the insert outer diameter, while the valley inner edge 111 resides at the same diameter as the seat diameter. In one example of a taper, the valley may be 0.125 inches in width at the valley outer diameter and 1.322 inches in width at the valley inner edge; the width being reduced 0.0885 inches over the radial length of the serration undulations.

Turning to FIGS. 5A-5C, an exemplary embodiment of two rotary serrator knife stacks mounted on correspondingly opposing arbors is shown. As seen, at least by the illustration's side view 500a, and front view 500b, the assembly of the top rotary serrator knife stack 502 and bottom rotary serrator knife stack 506, as mounted on correspondingly opposing arbors 516, 518, are such that the rotary serrator knives 503, and 507 have their respective keyways arranged in the same direction, and with the upper rotary serrator knife 503 (residing on the top arbor 516), the lower rotary serrator knife 507 (residing on the bottom arbor 518), and the two rotary serrator knives 503, 507 arranged with their serration undulations facing one another, as well as, in mesh in accord with the description below The lower rotary serrator knife 507, shown in 500a, 500b, and 500d of FIGS. 5A-5C, resides with a bottom backing plate 508 adjoining the flat rear face (opposite the serration undulations). The upper rotary serrator knife 503, in contrast, resides with the top backing plate 504 adjoining the flat rear face of the upper rotary serrator knife 503. Each, the top backing plate 504 and bottom backing plate 508, comprise smooth surfaces on each side and around their respective outer perimeters. Furthermore, each of the backing plates 504, 508 are substantially similar in diameter to the rotary serrator knives 503, 507.

Of slightly less diameter and adjoining the front faces of the respective rotary serrator knives 503, 507 are an upper spacer 510, and lower spacer 512, that provide space and control over a coil sheet as it might be presented in a shearing operation. The upper and lower spacers 510, 512, being of slightly smaller diameter, create corresponding gaps 514a, 514b. The upper spacer 510, mounted on the top arbor 516 and adjoining the front face of the upper rotary serrator knife 503, provides a space for the lower rotary serrator knife 507, in conjunction with the lower backing plate 508, to push the coil stock as penetration and shearing occur to a coil of stock if present. Likewise, the lower spacer 512, mounted on the lower arbor 518 and adjoining the front face of the lower rotary serrator knife 507, provides a space for the upper rotary serrator knife 503, in conjunction with the upper backing plate 504, to push the coil stock as penetration and shearing occur to a coil of stock if present.

If should be noted, the exemplary embodiment illustrates an upper and lower rotary serrator knives 503, 507 appearing to have a serration undulation patterns of relatively small height when compared to the overall diameter of the rotary serrator knives 503, 507. The serration undulations in reality may be more pronounced, and are only obscured by the upper and lower spacers 510, 512 residing about their front faces respectively.

Like the illustration of 500b of FIG. 5B, a detailed depiction 500d of FIG. 5C illustrates the spacing 514a, 514b between the upper rotary serrator knife 503 and it's adjoined upper spacer 510, with that of the lower rotary serrator knife 507 and its adjoined lower spacer 512, where the patterns match and the spacing is dependent on the thickness of the material to be cut. Also depicted is the overlap of the serrator knives 503, and 507. The overlap is defined as the interference caused when the correspondingly opposing arbors are arranged with a separation distance smaller than half the sum of the two serrator knives diameters. For example, if the two serrator knives have a diameter of ten inches (10 inches), the correspondingly opposing arbors may be set apart at a distance of nine and nine hundred and eighty five thousandths of an inch (9.985 inches). Alternatively, the correspondingly opposing arbors may be fixed in place and the diameters of the serrator knives must be fabricated to form the necessary overlap based on the material thickness to be cut.

Depiction 500c of FIG. 5C, is a detailed cross-sectional view of both upper rotary serrator knife 503 to the left, meshed with the lower rotary serrator knife 507 to the right The engagement shows three flat-top peaks 522a, 522b, 522c of upper rotary serrator knife 503 engaged with three flat-bottom valleys of the lower rotary serrator knife 507 with an engagement clearance 520 that is dependent on the material thickness to be cut. Engagement clearance, for example, can be 0.0150 of an inch, or from 0.0005 of an inch up to 5.00 inches, again dependent on the material thickness to be cut.

A further detailed, simplified, and exaggerated depiction of meshing of the two rotary serrator knives, such as 503 and 507 is depicted in the cross-sectional view 500e of FIG. 5D. Again, the top rotary serrator stack 502, comprising an upper backing plate 504, upper rotary serrator knife 503 and upper spacer 510, sandwiched together on an upper arbor (as shown in FIGS. 5A-5B), are meshed with the lower rotary serrator knife stack 506, comprising a lower backing plate 508, lower rotary serrator knife 507 and upper spacer 512, sandwiched together on a lower arbor. Specifically, a transition 503a of a serration undulation of rotary serrator knife 503, resides behind the undulation element 507a of rotary serrator knife 507 and overlaps 515 within the valley preceding the transition 503a both vertically and horizontally. The stock clearances 514a, 514b are evident as is the exaggerated engagement clearance 524, where the engagement clearance, and thus the horizontal overlap, as well as the vertical clearances 514a, 514b can be adjusted according the material to be cut, both in thickness and properties.

An embodiment 700 of multiple serrator knives employed on correspondingly opposing arbors to produce multiple serrated bar lengths from a wider stock is depicted in FIG. 7. An unrolled portion of coil stock 702, such as from a coil 602 of FIG. 6, is presented to and between the correspondingly opposed rotary serrator knife stacks comprising spacers 708, 718, rotary serrator knifes with backing plates 710, 712, and plain rotary knives 714, 716. Correspondingly opposed arbors, as would be used in such an arrangement are not shown. Further to the depiction, only the right most two pair of knives are rotary serrator knives 710, 712 (with backing plates), demonstrating that various configurations of operation can be performed. The remaining plain rotary knives 714, 716 produce straight bar stock. It is understood from the figures, that a coil of stock, such as 702 but in a narrower or wider construction can be similarly divided. For example, and as previously described, a single pair of correspondingly opposed rotary serrator knives, such as those of 710 and 712 could divide a narrow band of plain stock to dimension, imparting the serrations to the dividing line during the process. Likewise a wide coil can be divided into two with the same serration to the dividing line.

It is worth noting that the width of the backer plates in conjunction with the rotary serrator width, in concert with the correspondingly opposed pair determines the width of the serrated bar stock produced. For example, as shown in the depiction, stock 702, having a straight edge (on the right) produces a bar width 704 equal to the rotary serrator knife and backing plate pair 712, since the edge of the coil stock 702 is presented abreast of the smooth back of the rotary serrator knife and backing plate pair 712. Similarly, but without the benefit of the coil stock 702 straight edge, the width of the second, third and fourth bar stock 704 is again determined by the width of the rotary serrator knife and backing plate pairs 710, 712. The arrangement of disks on a slitting system, or the starting width of the stock used will determine the width of the end result. If additional spacers are added the bar can be produced wider.

Turning to the exemplary embodiment depicted in FIG. 8 a plurality of rotary serrator knives is mounted to correspondingly opposing arbors of a system, wherein serrated bar stock 802, 804, 806, 808, 809, 810, 811, 812 is produced with serrated edges along their dividing line. Some adjoining serrated bar stock to those shown are hidden from view by those shown. In this embodiment, the rotary serrator knives mounted on the upper arbor have the serration undulations oriented to the right and the rotary serrator knives mounted on the lower arbor are oriented with their serration undulations facing to the right. In this manner a wide coil of stock is sheared into multiple lengths of serrated stock of narrower width. The left most edge of the stock 814 (closest to the bottom) is sheared straight and pulled under and to the right leaving the second (from left to right) bar with a straight left edge. The shearing off of a narrow outer strip may counter the effect of a coil with damaged edges.

By operation of the two opposing first rotary serrator knives the second and third bars are sheared apart imparting a serrated edge along their line of division. The same is true for the remaining serrator knives. In such an arrangement, a coil of sheet material having a starting width wider than the sum of at least two bars is continuously uncoiled and fed into the rotary serrator system wherein the output is serrated bar stock. After divided, the serrated bar stock can be recoiled or cut to predetermined lengths.

The multiple serrated bar stock strips depicted in the top view 900 of FIG. 9 illustrates serrated bar stock after passage of coil sheet material though a combination of rotary serrated knives arranged as on a correspondingly opposing parallel arbors; similar to those depicted in FIG. 7 and FIG. 8. The various strips 902-924 are being separated, giving the appearance that some of the serration divisions are different, when in reality it is their relative alignment that makes them appear unmatched, such as with serrated bar stock pairs 906, 908, serrated bar stock pairs 910, 912, and serrated bar stock pairs 922, 924. Serrated bar stock 924 is traversing sideways, away from its divided counterpart.

Bar stock may exhibit characteristics in a broad range of sizes and shapes. For example, a bar stock of standard grating size and characteristics can have a flat-top peak of 0.125 of an inch wide, a transition section of 0.0625 of an inch wide, a flat-bottom valley of 0.125 of an inch wide, each measured along the bar length. The valley depth of the strip may be 0.09375 of an inch. Other embodiments such as thicker bar may exhibit different dimensions and shapes along one or more of the bar edges.

The embodiments of FIGS. 1A-1C, and 2, while depicting a one-piece rotary serrator knife, may be achieved by use of two-piece rotary serrator knife assemblies as described above. In a similar fashion, the embodiments of FIGS. 5A-5D, 7, and 8 may also, in an alternative manner, be achieved by the use of two piece rotary serrator knife assemblies as described above. Additionally, a non-serrated rotary knife, as embodied in FIG. 3, may be fabricated from a two-piece assembly to comprise a rotary disk and plain shearing knife inserts for mounting the plain shearing knife inserts, such that as with the serration inserts, they can be of separately sourced material, have different material properties than that of the rotary disk, and be exposed to different material treatment regiments.

Statement Regarding Preferred Embodiments

While the invention has been described with respect to the foregoing, those skilled in the art will readily appreciate that various changes and/or modifications can be made to the invention without departing from the spirit or scope of the invention as defined by the appended claims.

What is claimed is:

1. A rotary slitting system comprising:
two or more correspondingly opposed rotary serrator knives, each forming a disk, each disk comprising a first side and an opposing second side joined by an outer perimeter surface defined by a constant outer diameter;
said first side comprising circumferentially spaced serration undulations defined by radially arranged valleys, peaks, and transition elements defining radial lines where elements intersect, said radial lines having a pitch relative to their radius,
said circumferentially spaced serration undulations forming, in conjunction with said outer perimeter surface, a shearing edge of serration profile, wherein the serration undulations of each correspondingly opposed rotary serrator knife are synchronized and opposingly meshed thereto to impart a serrated edge upon material drawn between the two or more correspondingly opposed rotary serrator knives.

2. The rotary slitting system of claim 1, wherein the serration undulations further comprise a flat-top peak and valley pattern.

3. The rotary slitting system of claim 1, wherein the serration undulations further comprise a sinusoidal pattern.

4. The rotary slitting system of claim 1, further comprising an inner perimeter surface defined by an inner diameter concentrically located relative to the outer perimeter surface.

5. The rotary slitting system of claim 4, further comprising a first flat portion of said first side and a second flat portion of said second side, each extending from said inner diameter toward said respective serration undulations.

6. The rotary slitting system of claim 4, wherein height of the undulations descends with decreasing radial distance toward the inner diameter.

7. The rotary slitting system of claim 4, further comprising a first keyway disposed about the inner perimeter surface, the keyway synchronized to the serration undulations.

8. The rotary slitting system of claim 7, further comprising a second keyway disposed about the inner perimeter surface.

9. The rotary slitting system of claim 8, wherein the second keyway is optionally disposed at an angle from the first keyway, or of a differing size; therein forming a defined orientation of the two or more correspondingly opposed rotary serrator knives.

10. The rotary slitting system of claim 4, further comprising a flat portion of said first side, extending from said inner diameter toward said serration undulations.

11. The rotary slitting system of claim 10, wherein said flat portion has a height greater than, less than, or equal to a maximum height of said serration undulations.

12. The rotary slitting system of claim 10, wherein said first flat portion and said second flat portion each have a height greater than, less than, equal to, or a combination thereof a maximum height of said serration undulations.

13. The rotary slitting system of claim 1, wherein each disk comprises a material composition selected from the group consisting of high carbon steel alloy, tool steel, high speed steel, and tungsten carbide.

14. The rotary slitting system of claim 1, further comprising circumferentially spaced serration undulations disposed upon said second side of at least one of said two or more correspondingly opposed rotary serrator knives forming, in conjunction with said outer perimeter surface, a second shearing edge of serration profile.

15. The rotary slitting system of claim 14, further comprising an inner perimeter surface defined by an inner diameter concentrically located relative to the outer perimeter surface.

16. The rotary slitting system of claim 15, wherein height of the undulations descends with decreasing radial distance toward the inner diameter.

17. The rotary slitting system of claim 15, further comprising a first keyway disposed about the inner perimeter surface, the keyway synchronized to the serration undulations.

18. The rotary slitting system of claim 17, further comprising a second keyway forming a defined orientation of the two or more correspondingly opposed rotary serrator knives.

* * * * *